United States Patent
Facey et al.

(10) Patent No.: US 10,723,956 B2
(45) Date of Patent: Jul. 28, 2020

(54) ENHANCED DISTILLATE OIL RECOVERY FROM THERMAL PROCESSING AND CATALYTIC CRACKING OF BIOMASS SLURRY

(71) Applicant: 1888711 Alberta Inc., Red Deer County (CA)

(72) Inventors: Roderick Michael Facey, Edmonton (CA); Clayton Donald Allan, Red Deer (CA)

(73) Assignee: 1888711 Alberta Inc., Red Deer County (CA)

(*) Notice: Subject to any disclaimer, the term of this patent is extended or adjusted under 35 U.S.C. 154(b) by 0 days.

(21) Appl. No.: 16/041,110

(22) Filed: Jul. 20, 2018

(65) Prior Publication Data
US 2019/0023993 A1 Jan. 24, 2019

Related U.S. Application Data

(60) Provisional application No. 62/535,634, filed on Jul. 21, 2017.

(51) Int. Cl.
*C10G 11/18* (2006.01)
*C10G 3/00* (2006.01)
(Continued)

(52) U.S. Cl.
CPC .......... *C10G 11/187* (2013.01); *C10B 53/02* (2013.01); *C10G 1/083* (2013.01); *C10G 3/42* (2013.01);
(Continued)

(58) Field of Classification Search
CPC . C10G 1/083; C10G 3/42; C10G 3/62; C10G 11/185; C10G 11/187; C10G 70/041; C10B 53/02; H01M 8/06
See application file for complete search history.

(56) References Cited

U.S. PATENT DOCUMENTS

| 1,754,136 A | 4/1930 | Woidich |
| 1,904,586 A | 4/1933 | Winkler et al. |

(Continued)

FOREIGN PATENT DOCUMENTS

| CN | 1624077 A | 6/2005 |
| CN | 102325857 A | 1/2012 |

(Continued)

OTHER PUBLICATIONS

International Search Report and Written Opinion dated Oct. 2, 2018 in connection with PCT/CA2018/050887.
(Continued)

*Primary Examiner* — Brian A McCaig
(74) *Attorney, Agent, or Firm* — Cook Alex, Ltd.; Ryan M. Truesdale

(57) ABSTRACT

A method for thermal processing and catalytic cracking of a biomass to effect distillate oil recovery can include, particle size reduction. slurrying the biomass with a carrier fluid to create a reaction mixture, slurrying a catalyst with a carrier fluid to create a catalyst slurry, heating the reaction mixture and/or the catalyst slurry, and depolymerizing the reaction mixture with the catalyst. The reaction mixture can undergo distillation and fractionation to produce distillate fractions that include naphtha, kerosene, and diesel. In some embodiments, thermal processing and catalytic cracking includes vaporization of the biomass followed by distillation and fractionation. In some embodiments, a resulting distillate can be used as a carrier fluid. In some embodiments, the method can include desulfurization, dehydration, and/or decontamination.

20 Claims, 20 Drawing Sheets

(51) Int. Cl.
  *C10G 1/08* (2006.01)
  *C10B 53/02* (2006.01)
  *C10G 70/04* (2006.01)
  *H01M 8/06* (2016.01)
(52) U.S. Cl.
  CPC .............. *C10G 3/62* (2013.01); *C10G 11/185* (2013.01); *C10G 70/041* (2013.01); *H01M 8/06* (2013.01)

(56) References Cited

U.S. PATENT DOCUMENTS

| | | | |
|---|---|---|---|
| 4,663,025 | A | 5/1987 | Fu |
| 5,073,251 | A | 12/1991 | Daniels |
| 5,244,565 | A | 9/1993 | Lankton et al. |
| 7,473,348 | B2 | 1/2009 | Koch |
| 7,799,960 | B2 | 9/2010 | Buchert |
| 7,803,333 | B2 | 9/2010 | Buchert |
| 7,947,858 | B2 | 5/2011 | Buchert |
| 8,022,260 | B2 * | 9/2011 | O'Connor .............. C10G 1/006 585/242 |
| 8,137,508 | B2 | 3/2012 | Grispin |
| 8,722,948 | B2 | 5/2014 | Buchert |
| 8,728,416 | B2 | 5/2014 | Buchert |
| 2006/0096163 | A1 | 5/2006 | Dickinson et al. |
| 2007/0131585 | A1 | 6/2007 | Koch |
| 2008/0148628 | A1 | 6/2008 | Buchert |
| 2009/0255144 | A1 | 10/2009 | Gorbell et al. |
| 2010/0288622 | A1 | 11/2010 | Buchert |
| 2011/0020183 | A1 | 1/2011 | Storchi et al. |
| 2011/0235460 | A1 | 9/2011 | Rondeau |
| 2014/0374364 | A1 | 12/2014 | Spiess |
| 2015/0014219 | A1 | 1/2015 | Spiess |
| 2015/0030467 | A1 | 1/2015 | Spiess |

FOREIGN PATENT DOCUMENTS

| | | |
|---|---|---|
| EP | 2090783 A2 | 8/2009 |
| EP | 1538191 B1 | 8/2011 |
| EP | 2636719 A1 | 9/2013 |
| EP | 2679655 A1 | 1/2014 |
| EP | 2700700 A1 | 2/2014 |
| WO | 2012092644 A1 | 7/2012 |

OTHER PUBLICATIONS

Office Action dated Aug. 28, 2019 issued in connection with Canadian application No. 3,012,153.

* cited by examiner

Section A

Section C

Section D

Section E

Section F

Section G

Section H

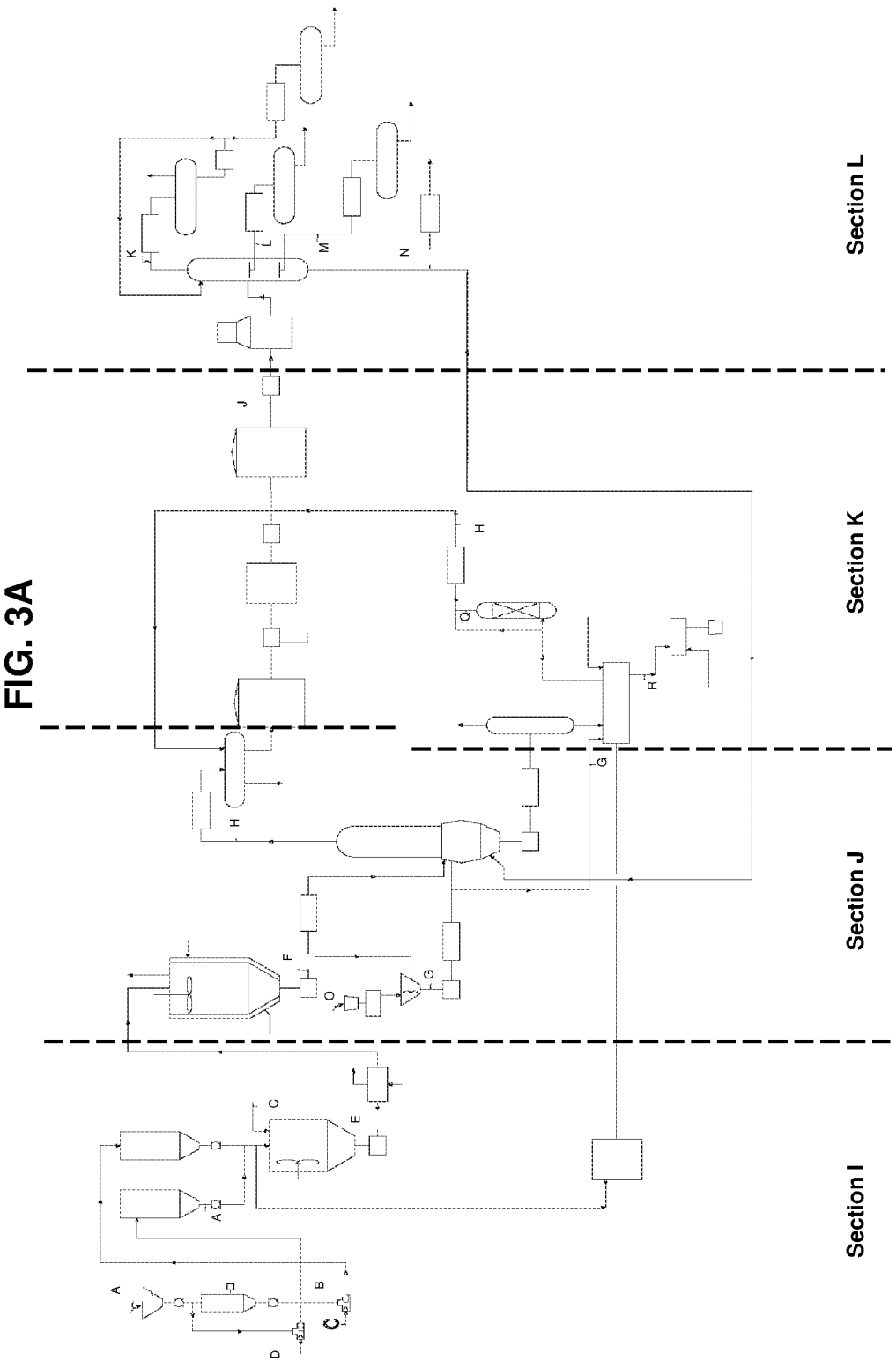

Section I

Section J

Section K

Section L

Section M

Section N

Section P

ENHANCED DISTILLATE OIL RECOVERY FROM THERMAL PROCESSING AND CATALYTIC CRACKING OF BIOMASS SLURRY

CROSS-REFERENCE TO RELATED APPLICATIONS

This application claims priority benefit from U.S. Application Ser. No. 62/535,634 filed on Jul. 21, 2017 entitled, "Enhanced Distillate Oil Recovery From Thermal Processing and Catalytic Cracking of Biomass Slurry". The '634 application is hereby incorporated by reference herein in its entirety.

FIELD OF THE INVENTION

The present invention relates to thermal processing and catalytic cracking of biomass slurry to recover distillate oil.

In the present process and apparatuses for thermal processing and catalytic cracking of biomass slurry, different methods of catalytic cracking and catalyst types are optionally employed. Enhanced distillate oil recovery from the thermal processing of residual biomass is attributable to vaporization of residuals for recovery as an oil or optionally catalytic cracking of the vapor stream to increase distillate production for fuel production.

The present process provides enhanced distillate oil recovery from biomass slurry that is unconvertable by catalytic depolymerization through including in the process an apparatus for the vaporization of residual biomass slurry at temperatures from between and inclusive of 300° C. to 1000° C. into a vapor, such that a separate device can be used for catalytic cracking of the vapor to increase distillate oil production. The process couples the apparatuses for thermal processing with catalytic cracking for enhance distillate oil recovery and the enhanced conversion of biomass into a fuel.

Methods for producing a low carbon intensity renewable fuel using an alternative carrier fluid derived from renewable resources to replace oils such as petroleum, vegetable oil, and/or animal-based oils are also disclosed. One such alternative carrier fluid can be a renewable distillate or fuel derived from renewable resources such as biomass.

SUMMARY OF THE INVENTION

In one embodiment, a method of thermal processing and catalytic cracking of biomass slurry for enhanced distillate oil recovery includes the steps of particle size reduction, slurrying with carrier fluid, heating, dehydration, catalytic depolymerization and high temperature thermal desorption. The method includes the step of producing a catalytically active biomass by transferring the biomass to produce a reaction mixture through mixing of the biomass with a carrier fluid. The carrier fluid, designed to slurry the biomass, can comprise many different types of fluids. Contemplated in this method is the use of an oil (new or used) as the medium for slurrying the biomass. This oil can be a hydrocarbon based oil, such as used motor oil, or a vegetable based oil, such as canola oil, or an animal derived fat such as tallow/yellow grease. In either case the carrier fluid is mixed with biomass, which can be in its raw state or particle size reduced to increase surface area with respect to particle size.

Particle size reduction of the biomass followed by mixing of a carrier fluid with biomass is the first step in the preparation of a reaction mixture. Following the preparation of a reaction mixture is dehydration of that mixture to remove and recover free water associated with either the carrier fluid and/or the biomass. This can involve the indirect heating of the reaction mixture in a reactor designed to operate from under a vacuum up to atmospheric conditions. The reaction mixture does not become catalytically active until such time the reaction mixture is mixed with a catalyst. The present method is based on preparation of a catalytically active biomass to initiate a catalytic process through the addition of heat to a temperature to activate the catalyst. Zeolite based engineered catalysts are used such that the sieve size and the anionic and cathodic contact coating sites are conducive to the production of distillates comprising predominately of the mixtures diesel and kerosene.

Producing a catalytically active biomass slurry involves the addition of a zeolite catalyst, specifically engineered and proprietary to the process, such that the catalyst to be suspended in the reaction mixture. The reaction mixture, comprising both biomass and carrier fluid, is subject to the cracking action of the catalyst at the temperature at which the system is operated. The carrier fluid is continuously treated for residual solids removal and replenished from the high viscosity, non-evaporative parts of the biomass and carrier fluid's hydrocarbon fractions.

As the biomass and carrier fluid is heated to the catalyst activation temperature of around 260° C. at near atmospheric pressures, the long chain hydrocarbons, following exposure to the catalyst, are weakened to break up and form diesel and kerosene-like hydrocarbon distillate fractions, which is then recovered as a vapor via a distillation column. Vapor recovered from the distillation tower is then collected, cooled and condensed to produce a distillate/water mixture, which then undergoes gravitational oil/water separation prior to desulfurization and fractionation of the distillate into its individual distillate fractions. The recovered distillate is separated into its fractions: naphtha, kerosene and diesel. These fractions can then be processed into fuel blends.

In another embodiment of the present method, there are two ways by which the catalyst can be added: (1) liquid phase contact and (2) vapor phase contact. In the liquid phase contact, the catalyst is mixed together with the biomass and carrier fluid. The present method is configured for catalyst addition at specific points within the process. Method 2 is employed in the catalytic depolymerization step such that the catalyst is added directly to the biomass and carrier fluid to simulate liquid phase contact. Optionally, method 1 can or cannot be employed with option 2 in which the process can be configured to conduct catalyst cracking of the vapor recovered from thermal processing of the biomass slurry using high temperature thermal desorption. In the vapor phase contact method, the biomass suspended in the carrier fluid would be first subjected to thermolysis using high temperature thermal desorption operating up to temperatures of 1000° C. to vaporize and produce a volatile fraction.

Thermal processing of residual biomass is an important step for enhance distillate production through distillation and catalyst cracking. In this method, the catalyst is inserted into the path of the moving vapor by way of fixed bed or fluidized bed reactor. As the vapor moves through the catalyst, the hydrocarbon vapor is catalyst cracked to achieve enhanced distillate production. The product yield has been reported to not differ significantly between the two modes of addition. Using a combination of different catalyst addition methods provides the flexibility of using different types of catalysts to influence the quality and composition of the distillate recovered from the process. Different catalyst types can be employed between addition methods 1 and 2. Each catalyst, depending on the addition method, has been engineered and selected based on its appropriate pore size and contact site coatings that facilitate conversion of high molecular weight boiling fractions.

In another embodiment of the present method, the biomass can be a biological waste material derived from industrial operations such as wood residues, sawdust, cellulose from paper production, as well as other organic substances such as grains, straw and corn. The present method is not limited to biomass. A feature of the present method is the use, in place of biomass, of the inert fraction associated with Municipal Solid Waste comprising plastics and rubber. The present method can process the above range of waste types to produce a distillate. For the purpose of describing the present method, the waste type from which the distillate is produced is based on biomass. Depending on the biomass type, the biomass can undergo particle size reduction to reduce both particle size and moisture content.

Included as a feature of the present method is a particle size reduction step that includes a receiving hopper, a rotary valve controlled by a variable speed drive configured to control the rate of feed into the particle size reducer, an ultrasound particle size reducer capable of reducing the biomass particle size into a fine particle dust as well as reducing moisture content. Pilot plant tests indicated that proper slurry biomass should be finely ground to between a particle size range that resembles a fluff or a very fine dust. The ground biomass should be mixed immediately following the size reduction process with the carrier fluid prior to storage to avoid or at least impede bulking and "balling" of the biomass within the carrier fluid. This step is important to producing a catalytically active biomass slurry such that the ground biomass is uniformly dispersed in the carrier fluid. Induction and mixing of the ground biomass or fluff with the carrier fluid is by a jet mixing system. Ground biomass should be mixed with carrier fluid and stored within cone bottom slurry tanks, while native biomass, or coarse particle biomass, can be stored in vertical storage silos.

In another embodiment of the present method, the reaction mixture is transferred following dehydration to a heater, such as a furnace, such that the dehydrated biomass slurry without the catalyst added is heated to temperatures that exceed the catalyst activation temperature. At this temperature, a small portion of the reaction slurry can undergo distillation to produce a vapor that then can be cooled and condensed to form a small portion of distillate that contributes to the recovery of overall distillate volume for the process. To diminish coke production that can lead to fouling of the heating surfaces, the catalyst is not added to the reaction mixture until the reaction mixture is injected into the reactor of the catalytic depolymerization step and that the method of heat addition is by a direct method.

In another embodiment of the present method, the mixing of the reaction mixture with the catalyst is used to form a catalytically active biomass slurry. This method involves heating separately the reaction mixture with the catalyst added to temperatures that exceed the catalyst activation temperature. While separately heating the catalyst, mixed and slurried with the same carrier fluid, to a temperature that is below the catalyst activation temperature. These two separate streams are then mixed together within the reactor chamber of the catalyst depolymerization apparatus, such that the mixing of the streams produces a catalytically active biomass slurry with a temperature above that of the temperature for activation of the catalyst. Upon achieving these conditions through mixing, the catalytic process is initiated, and the production of distillate vapor can immediately commence. To maintain the catalytic process, the mixture is continuously mixed and additional hot carrier fluid recovered from the underflow of the fractionation process is added to the reactor separate from the other two process streams so as to replenish heat loss from the process due to the production of distillate vapor. This occurs while the reactor operates steady state receiving on a continuous constant rate inputs of the reaction mixture and the catalyst slurry. This method of stream addition within the reactor of the catalytic depolymerization step is important to diminishing coking such that the streams, through the mixing of different temperature streams facilitates direct heating of the reaction mixture to form a catalytically active biomass slurry that can initiate the catalytic process. This process step avoids indirectly heating the catalytically active biomass slurry, which can lead to heating surface fouling and loss of overall process performance and efficiency and increase maintenance/operation issues.

In another embodiment of the present method, residue recovered in the underflow from the reactor of the catalytic depolymerization step undergoes further distillation and catalyst cracking as a way to enhance the cracking and recovery of a distillate oil from the biomass. The residue recovered in the underflow of the reactor can contain biomass residues, spent catalyst and the carrier fluid. The method and apparatus for thermal processing of the recovered residue includes using high temperature thermal desorption operating between and inclusive of the temperatures 300° C. to 1000° C. This apparatus is configured to permit the direct addition of a catalyst slurry to the residue slurry within the thermal desorption apparatus to have the recovered residue form a catalytically active residue slurry. To avoid indirect heating to initiate catalyst cracking of the catalytically active residue slurry, a slip stream of the recovered carrier fluid from the underflow of the fractionation process is added to the catalytically active biomass slurry for direct heating to raise the temperature of the mixture following the addition of catalyst slurry stream to above the catalyst activation temperature. These operating conditions are achieved within the initial section of the thermal screw which can then initiate the catalyst process.

To enhance catalytic cracking, the catalytically active residue slurry is continuously mixed within the thermal screw. As the catalytically active biomass slurry is conveyed along the length of the thermal screw, a decrease in the catalyst process can occur. To compensate for the rate of reduction of distillate vapor production, the catalytically active biomass slurry is indirectly heated to distillation temperatures to convert residual biomass and carrier fluid into a distillate vapor. The present method of indirect heating due to high operating temperature (up to 1000° C.) can distill and vaporize unreacted organic biomass to produce a distillate vapor. The present method thus offers an effective method of achieving a high biomass to distillate conversion ratio. The apparatus employs electric heating elements on the exterior of the thermal screw that can be temperature controlled to facility temperature controlling the heating process in terms of thermal energy input along the length of the thermal screw. The heating system of the high temperature thermal desorption system is capable of operating over a wide range of operating temperatures that includes low and high temperature thermal desorption and pyrolysis.

In another embodiment of the present method, distillate and water vapor produced from distillation and catalyst cracking is recovered from both the catalytic depolymerization step and from the high temperature thermal desorption step for indirect cooling via coolers where it can be discharged into a common oil/water separation unit. In some embodiments, the coolers are aerial coolers. The oil/water separation unit is an important component in the process as it is configured to gravity separate the distillate oil from the water, as well as to partition to the water phase particulate matter associated with the vapor or coke precipitate that can form through post catalyst cracking reactions. Water is recovered and disposed of, while the distillate can be recovered and transferred into fuel refinement/preparation process for manufacture of automotive quality fuel. As with most catalyst cracking processes, a small amount of coking can occur. The adverse impact coking has on process performance and quality is diminished through the direct heating method that is employed in the present method versus indirect heating that can lead to increase coke production. Coke that is produced is limited in further impacting the process through its removal via the water phase in the distillate/water separation step.

In another embodiment of the present method, the fractionation step used to distill the distillate into the distillate fractions diesel, kerosene and naphtha is configured to recover the unused portion of the carrier fluid. In vaporizing the organic fraction associated with the residual stream recovered in the underflow from the catalytic depolymerization step, the amount of residue for disposal is significantly reduced, furthermore organic material residual associated with the biomass is vaporized and optionally can be catalyst cracked for enhanced distillate production. In addition, a portion of the hot recovered unused carrier fluid can be recycled for direct heating and slurrying in the catalytic depolymerization step to diminish coking. This process step is important in significantly reducing the overall operating cost of the process as it relates to the purchase and consumption of the carrier fluid in the process. The fractionation step can include a heater for indirect heating the desulfurized distillate to operating temperatures between and inclusive of 350° C. and 400° C., a fractionation tower with trays to recover distillate fractions diesel and kerosene, a reflux drum with recycle to promote naphtha recovery, an aerial cooling tower configured for individual cooling of the distillate streams naphtha, kerosene, diesel and recovered unused carrier fluid, and individual separators configured to collect each condensate distillate stream. In some embodiments, the heater can be, among other things, a furnace or boiler. Light gas or vapors that exit through the top of the fractionation tower can be flared or alternatively used as a fuel gas within the process.

In one embodiment, the apparatus for thermal processing of the recovered residue from the underflow of the catalytic depolymerization step includes, heat exchangers for pre-heat of the residue slurry, a two phase separator for separation of off-gases/vapor from the heated residue slurry, a level control valve that controls slurry flow discharge into the thermal screw which is important to achieving the trough utilization capacity and heat transfer within the thermal screw, a thermal screw equipped with exterior electric temperature control heating elements and an injection port for the addition of additional catalyst slurry, a cooler, such as an aerial cooler, for cooling so as to condense distillate vapor produced via thermal processing by the thermal screw, a two phase distillate/water separator configured to gravity separate the distillate from the water, transfer pumps to transfer separately the cooled and recovered distillate and water fractions, and a cooling screw for thermal energy recovery from the ash comprising the inerts that are discharged from the thermal screw. The thermal screw also includes a rotary valve on the discharge so as to maintain the inert operating environment within the thermal screw and to avoid or at least impede the induction of air and oxygen into the system.

In another embodiment, an apparatus for thermal processing of residual biomass slurry recovered from the underflow of the catalytic depolymerization process is important to achieving high biomass to distillate ratios and enhanced distillate oil production. It is important to converting a solid material not accessible to catalyst cracking into a vapor that it be in a form suitable for catalyst cracking, thereby enhancing distillate production for use as a fuel.

In another embodiment, an apparatus for thermal processing and catalytic cracking of biomass slurry, includes a catalyst slurrying step, such that the catalyst is metered, mix and slurried with the carrier fluid to facilitate its pre-heating via a heat exchanger for injection into the reactor of the catalytic depolymerization step. The catalyst slurrying system includes a hopper for the manual addition of the catalyst, a belt conveyor with weigh scale configured to meter the correct catalyst dosage into a blend tank which is configured to receive both catalyst and carrier fluid, a mechanical mixer configured to mix the catalyst with the carrier fluid, a feeder screw and pump for transfer of the catalyst slurry and a heat exchanger for preheat of the catalyst slurry to temperatures below the catalyst activation temperature.

In some embodiments of the present method, distillates derived from external renewable resources can be used as carrier fluid(s) to produce a low carbon renewable fuel. Such distillates can include, but are not limited to, biomass made from biological and/or industrial waste materials, diesel-based distillates and kerosene-based distillates. In some embodiments, the distillates produced by the present method can be recycled back into the process for use as carrier fluids to slurry biomass and other feedstock.

In at least some of these embodiments, the oil-based carrier fluid can be substituted for a renewable distillate as the slurring agent. In some embodiments, this can be achieved by using an initial charge of renewable diesel distillate obtained from an outside source to slurry the biomass for the production of a renewable distillate. In some embodiments, once the process has produced sufficient volumes of its own renewable raw distillate, use of the outside source can be discontinued, and a portion of the raw renewable distillate created by the process can be recycled for use as a carrier fluid. In some embodiments, such a process can produce a low carbon intensive fuel that is almost, if not entirely 100% renewable based.

In some embodiments, instead of mixing the biomass with a carrier fluid, the solid biomass is vaporized. In at least some embodiments, catalytic depolymerization of the biomass can occur simultaneously or subsequently to vaporization.

In some embodiments of the present method, carrier fluids can undergo decontamination to remove contaminants such as, but not limited to, sulfur, hydrocarbons, nitrogen, oxygen compounds, resinous and asphaltic compounds, metals, salts, aromatics, mercaptans, and/or other suspended solids. Decontamination can include desulfurization and/or various chemical treatments. In some embodiments, this method can be used to treat contaminated carrier fluids prior to entry into the process to significantly reduce the contaminate load on the method and apparatuses described herein. Some embodiments of this method can include apparatuses for mixing the carrier fluid with treatment chemicals to precipitate and flocculate contaminants as a sludge.

BRIEF DESCRIPTION OF THE DRAWING

FIG. 3A is a schematic diagram of a third embodiment of an apparatus and method for thermal processing of biomass.

DETAILED DESCRIPTION OF ILLUSTRATIVE EMBODIMENT(S)

Figure 1A:
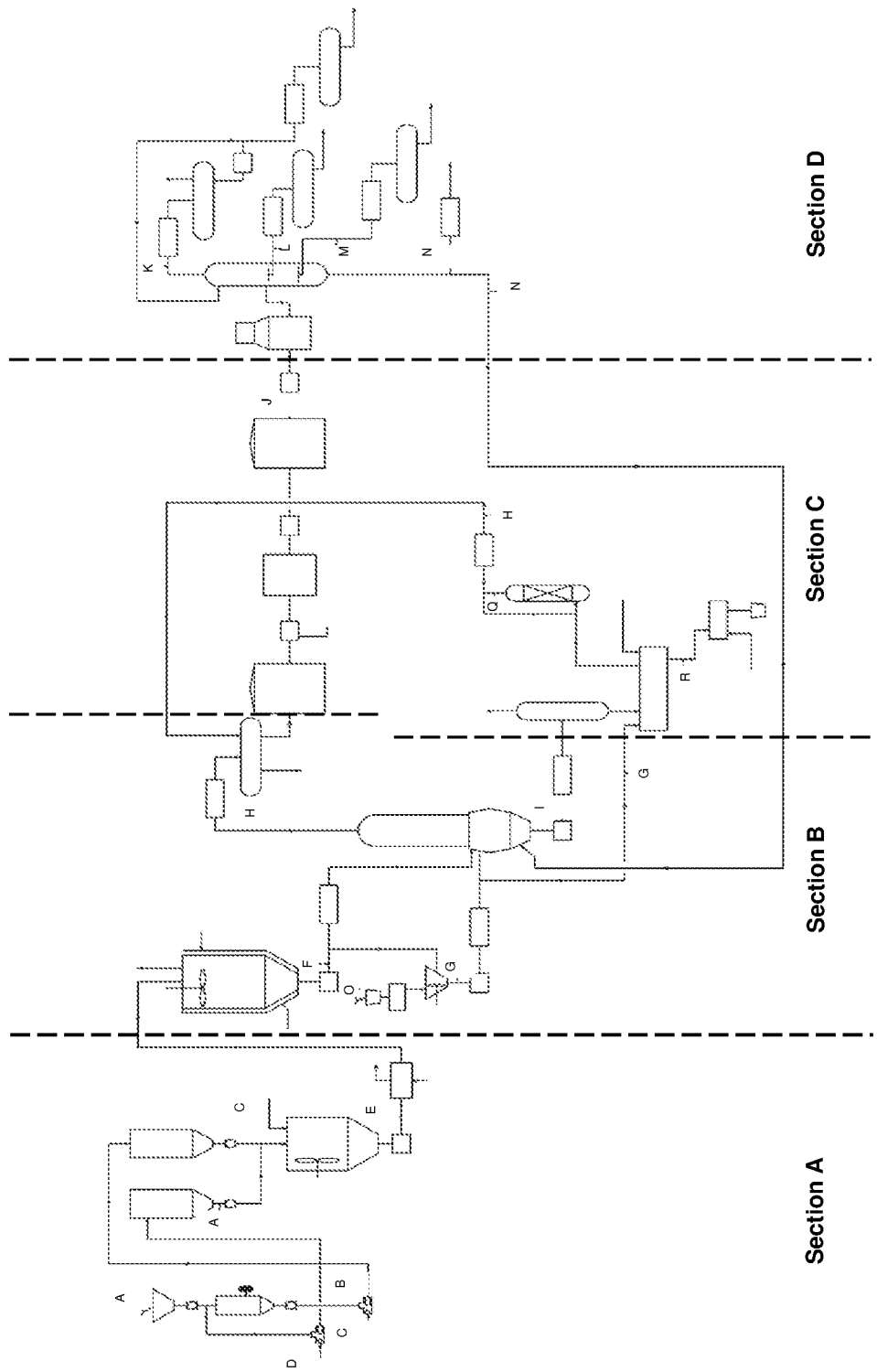
FIG. 1A is a schematic diagram of one embodiment of an apparatus and method for thermal processing of biomass.
Figure 1B:
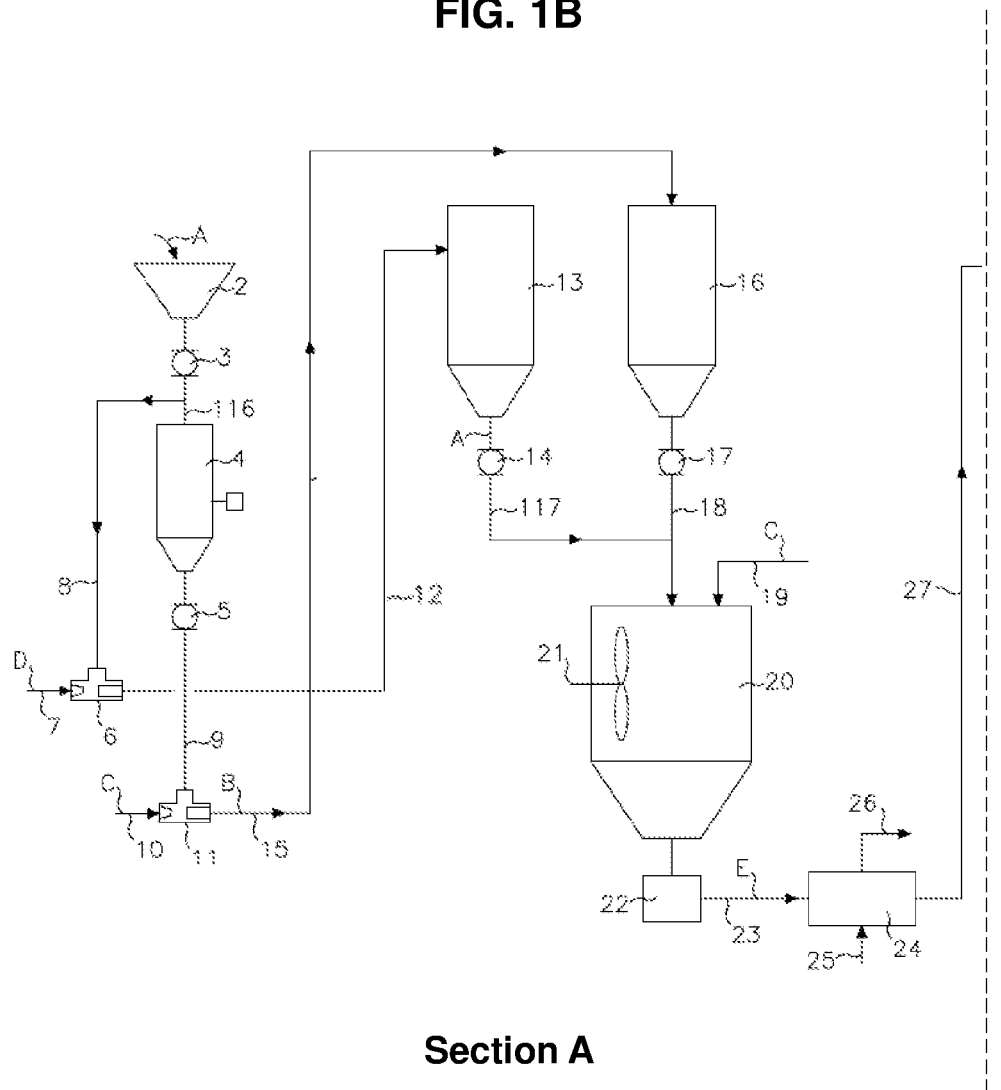
FIG. 1B is an enlarged view of a first section of the schematic diagram of FIG. 1A.
Figure 1C:
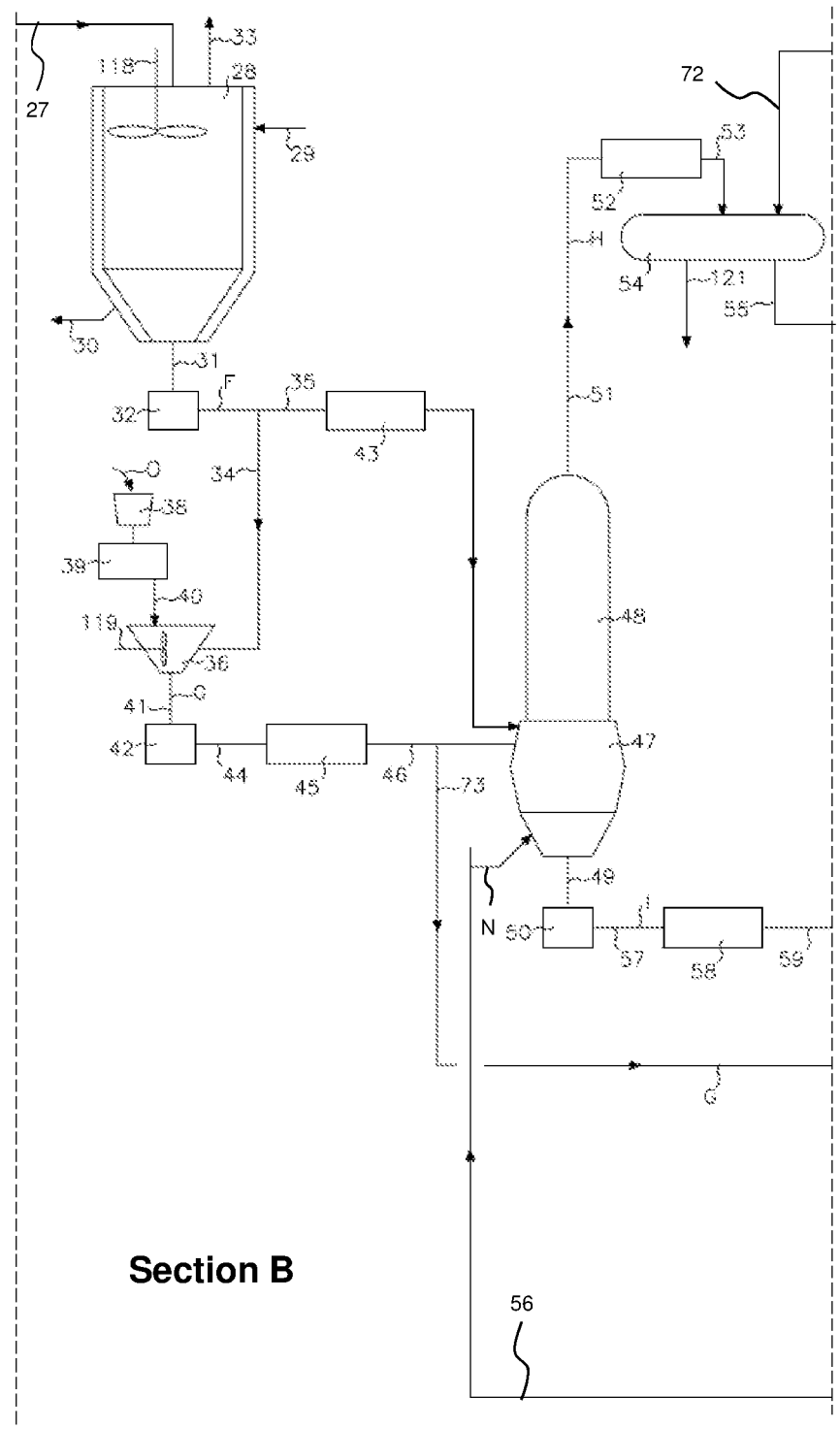
FIG. 1C is an enlarged view of a second section of the schematic diagram of FIG. 1A.
Figure 1D:
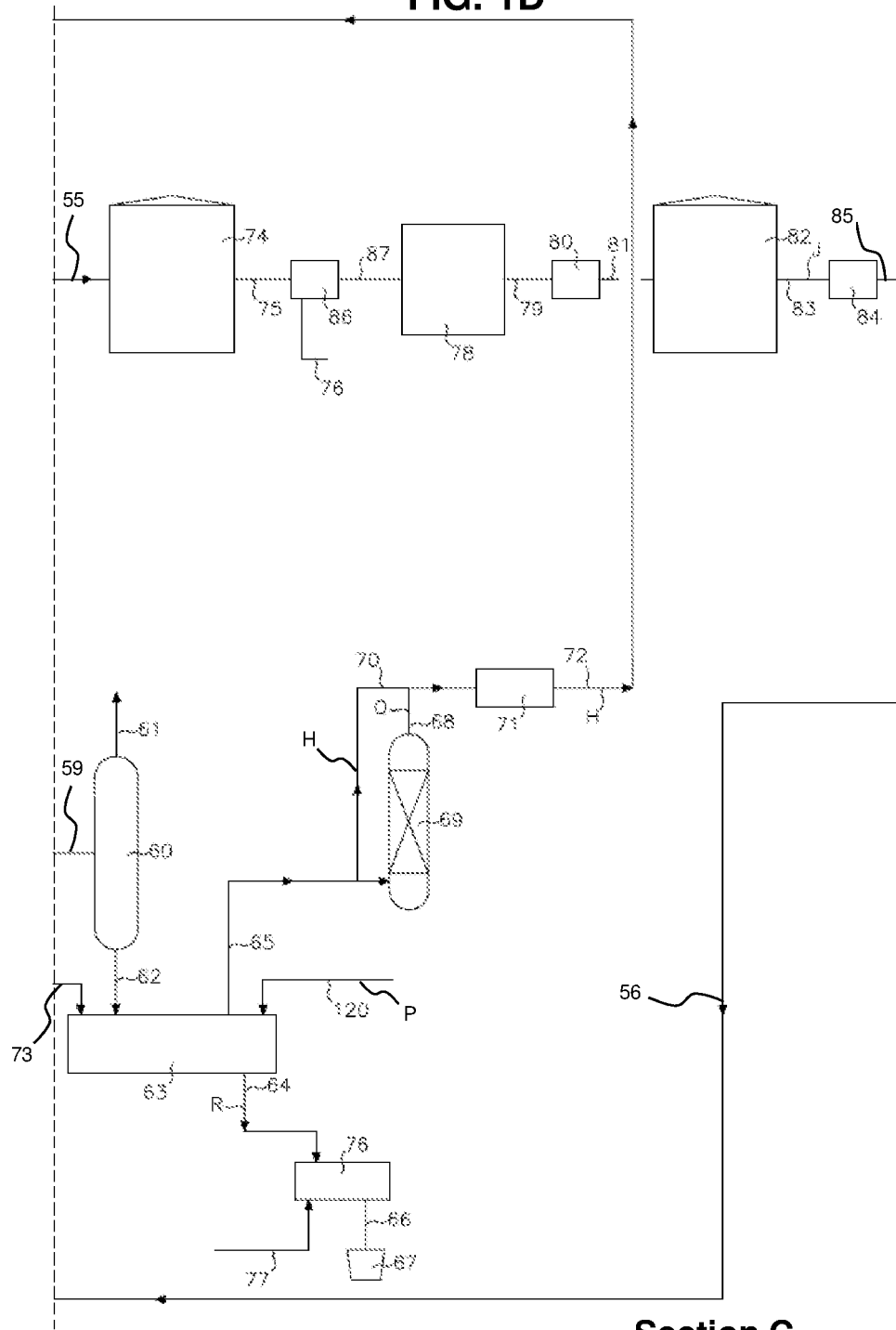
FIG. 1D is an enlarged view of a third section of the schematic diagram of FIG. 1A.
Figure 1E:
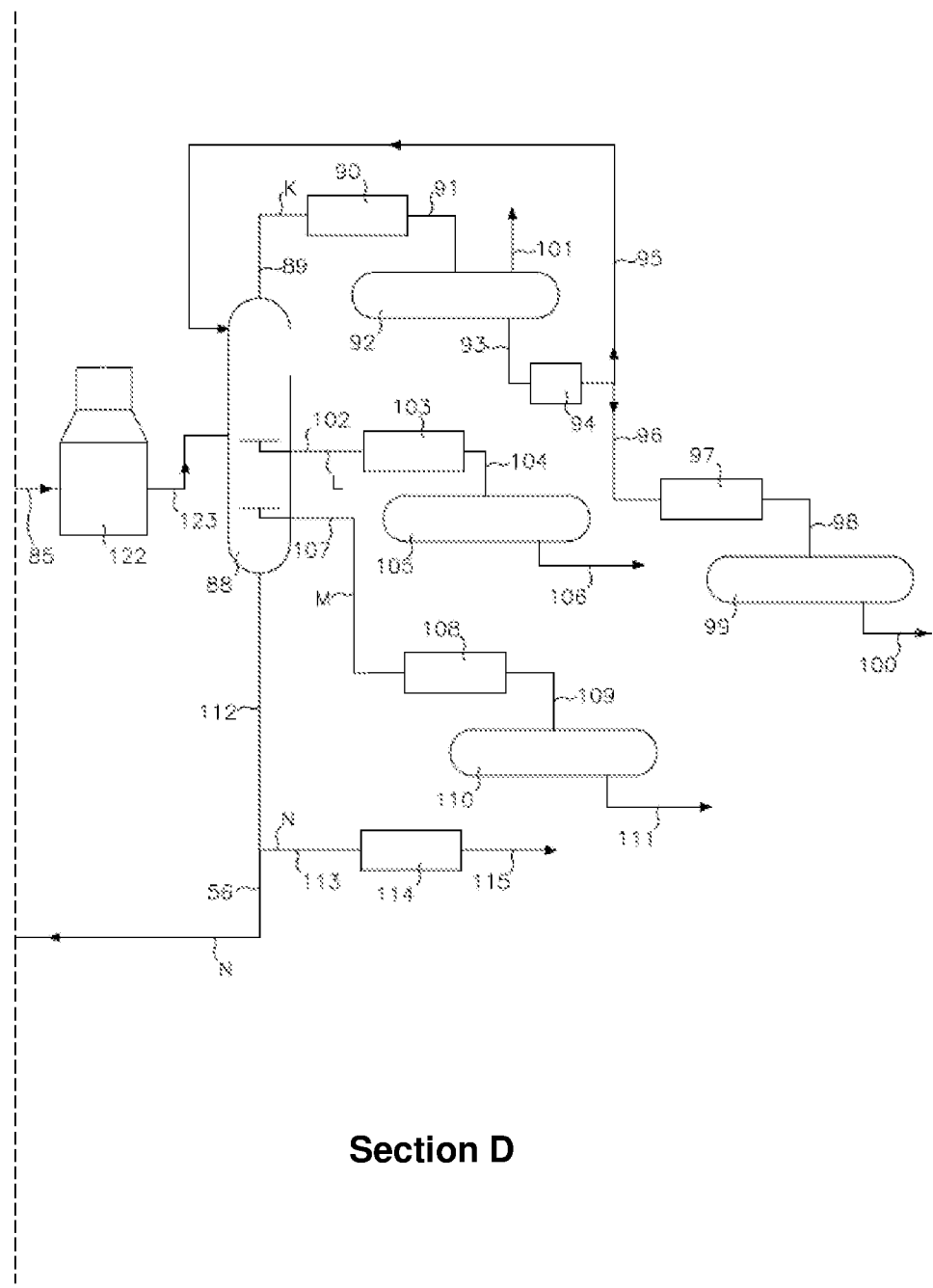
FIG. 1E is an enlarged view of a fourth section of the schematic diagram of FIG. 1A.

Turning first to FIGS. 1A-1E, a schematic diagram illustrates an exemplary embodiment of a method and apparatus for thermal processing of biomass. This example of an apparatus according to the present method involves the production of distillate oil for supply to an automobile. The present method involves the production of the base distillates for the manufacture of a low sulfur diesel fuel oil or other fuel distillate types such as kerosene that can be used to power automobiles, boats, planes, trains or power generation equipment.

In various embodiments of the present method, heating can be performed at temperatures of between and inclusive of 200° C.-400° C. to both vaporize biomass and activate a catalyst for catalytical depolymerization of the biomass. In some embodiments, vapors from the biomass can be released into a slurry comprising carrier fluid and a catalyst such that the vapors can be dissolved into the liquid phase of the slurry and catalyst cracked. In some embodiments, the by-products of the catalyst cracking process can then be distilled and released from the liquid slurry phase as distillate vapor. In some embodiments, distillate vapor can be cooled, condensed, and used to produce a renewable fuel.

Biomass A is obtained as waste product and can be a mixture of biological residues. Water content can be variable, where the present method involves processes specifically for the separation and recovery of both free and bound water from the reaction mixture. Biomass A can be of different compositions, based on source and difference in substance compositions of organic substances making up the biomass. The apparatus includes hopper 2 for accepting coarse to finely particulate biomass.

Arranged on the bottom of the hopper is metering valve 3 which is connected to particle size reduction device 4 or from metering valve 3 along conduit 8 to pump 6 via conduit 7. In some embodiments, metering valve 3 is a variable speed controlled rotary valve. In some embodiments, particle size reduction device 4 is an ultrasound particle size reduction unit. In some embodiments, pump 6 is air D driven educator or jet.

Conduit 8 is used for when the biomass in its receiving state is finely ground and does not require particle size reduction. Medium to coarse particulate biomass A are reduced to a particle size using the particle size reduction device 4 to produce a finely ground particulate powder using conduit 116.

Arranged at particle size reduction device 4 is metering valve 5, such as a variable speed controlled rotary valve, which is connected to slurrying device 11, such as a jet mixer. Slurrying device 11 receives as a primary inlet flow carrier fluid C via conduit 10, which can be a hydrocarbon-based oil, such as but not limited to motor oil, vegetable based oil, such as but not limited to canola oil, and/or an animal-derived fat such as, but not limited to, tallow/yellow grease, and as a secondary inlet flow ground biomass from metering valve 5 via conduit 9. In some embodiments, the motor oil is used. Slurrying device 11 produces mixed slurry B known as the reaction mixture comprising carrier fluid and biomass. From slurrying device 11 along conduit 15, the reaction mixture enters storage vessel 16. In some embodiments, storage vessel 16 is a cone bottom circular steel tank. Alternatively, biomass A can enter vertical storage vessel 13 via conduit 12. In some embodiments, vertical storage vessel 13 is a vertical circular storage silo.

The reaction mixture can be produced by taking biomass A from the bottom of storage vessel 13 via conduit 117, such that metering valve 14 meters biomass A via conduit 117 and 18 into blend vessel 20 which can be open or closed to the atmosphere and equipped with mixer 21. In some embodiments, mixer 21 is a side entry fixed or swivel mechanical mixer. In some embodiments, metering valve 14 is a variable speed controlled rotary valve. In some embodiments, blend vessel 20 is a circular cone bottom steel tank. In some embodiments, mixer 21 is a side entry fixed or swivel mechanical mixer. Blend vessel 20 also receives via conduit 19 carrier fluid C, which can be warm or hot (85° C.). Mixer 21 mixes biomass A and carrier fluid C to produce reaction mixture E that is a homogeneous blend of biomass and carrier fluid. Alternatively blend vessel 20 can receive reaction mixture in the form of mixed slurry B from storage vessel 16 via conduit 18 where metering valve 17 meters mixed slurry B. In this case, carrier fluid C addition via conduit 19 can be optional. In some embodiments, metering valve 17 is a variable speed controlled rotary valve.

Arranged at the bottom of blend vessel 20 is transport device 22 for transporting via conduit 23 reaction mixture E to heating device 24. In some embodiments, transport device 22 is a feeder screw coupled with a slurry pump. In some embodiments, heating device 24 is a spiral heat exchanger. Heating device 24 indirectly heats reaction mixture E to temperatures up to 160° C. using as the heating medium steam or hot thermal fluid that enters and leaves the heating device via conduits 25 and 26. From heating device 24 the hot reaction mixture enters heating vessel 28 via conduit 27. In heating vessel 28, the heating medium can be steam or hot thermal fluid which enters and leaves heating vessel 28 via conduits 29 and 30, respectively. In some embodiments, heating vessel 28 is a jacketed vessel. Heating vessel 28 is equipped with mixer 118, configured to continuously mix reaction mixture E while heating to vaporize and remove free water as a vapor via conduit 33 from reaction mixture E. Heating vessel 28 can be operated at atmospheric conditions or under a vacuum to reduce the boiling temperature for vaporization of the water.

Arranged at the bottom of heating vessel 28 is transport device 32 for transporting via conduit 31 dehydrated reaction mixture F to both heating device 43 via conduit 35 and to blend vessel 36 equipped with mixer 119 via conduit 34. In some embodiments, transport device 32 is a feeder screw coupled with a slurry pump. In some embodiments, heating device 43 is a spiral heat exchanger. In some embodiments, blend vessel 36 is a circular cone bottom steel tank that can be open or closed to the atmosphere. In some embodiments, mixer 119, is a side entry fixed or swivel mechanical mixer.

In blend vessel 36, dehydrated reaction mixture F can be mixed with slurried catalyst O. Catalyst O can be delivered from vessel 39 to blend vessel 36 via conduit 40. Vessel 39 can include hopper 38 with a mixer to slurry catalyst O. In some embodiments, the system utilizes a metering device, such as a belt conveyor with weigh scale. In some embodiments, vessel 39 can be configured to meter catalyst O in blend vessel 36.

Arranged at the bottom of blend vessel 36 is transport device 42 where catalyst slurry G is routed via conduit 41 from blend vessel 36 to transport device 42. In some embodiments, transport device 42 is a feeder screw coupled with a slurry pump. From transport device 42 catalyst slurry G is routed via conduit 44 to heating device 45 configured to heat the catalyst slurry to temperatures below the activation temperature of the catalyst. In some embodiments, heating device 45 is a spiral heat exchanger. From heating device 45, heated catalyst slurry G is routed via both conduit 46 to reactor 47 of the catalytic depolymerization unit and via conduit 73 to vaporizer device 63. In some embodiments, vaporizer device 63 is a thermal desorption screw controllable to operate at temperatures from low to high temperature thermal desorption up to temperatures typical for pyrolysis (300° C. to 1000° C.).

Heated dehydrated reaction mixture F and heated catalyst slurry G are injected at similar locations within reactor 47, such that the blended temperature of the two mixtures can produce a catalytically active biomass slurry at a temperature that is above the catalyst activation temperature, immediately initiating the catalytic process. To supplement and make-up for heat loss associated with vapor H production, a slip stream of hot recovered carrier fluid N from the fractionation tower 88 is added via conduit 56 to reactor 47. Vapors H produce from distillation and catalyst cracking of both the biomass, and to a lesser extent the carrier fluid are recovered in distillation tower 48. Vapors H comprise both water and organic vapors typical of the distillates naphtha, kerosene and diesel.

Vapors H recovered in distillation tower 48 are routed via conduit 51 into cooling device 52. In some embodiments, cooling device 52 is an aerial cooler. In cooling device 52, the vapors are condensed and allowed to gravity drain via conduit 53 into separator 54. In some embodiments, separator 54 is a two-phase horizontal separator. Separator 54 can also receive condensed vapors via conduit 72 via cooling device 71 from the residual solids management system. Condensed vapors H comprising water and distillate are gravity separated in separator 54, such that process water is removed via conduit 121 for disposal. Distillate is recovered and routed via conduit 55 into storage tank 74. In some embodiments, storage tank 74 is a circular flat bottom steel tank operating closed to the atmosphere. From storage tank 74, distillate to be desulfurized is routed via conduit 75 to heating device 86 using as a heating medium of steam or hot thermal fluid via conduit 76. In some embodiment, heating device 86 is a plate and shell heat exchanger. Heating device 86 heats the distillate to temperatures up to 100° C., where it is routed via conduit 87 into a desulfurization device 78. In some embodiments, desulfurization device 78 is a selective adsorption media desulfurization unit. Sulfur components associated with the distillate are adsorbed and removed via a selective medium. The selective adsorption media once exhausted can be heat treated to recover the sulfur thus regenerating the media for continued use. Desulfurized distillate recovered from desulfurization device 78 is routed via conduit 79 into cooling device 80. In some embodiments, cooling device 80 is an aerial cooler. Cooling device 80 cools the desulfurized distillate to temperatures below 60° C., where it is routed via conduit 81 into storage tank 82. In some embodiments, storage tank 82 is a circular flat bottom steel tank operating closed to the atmosphere.

Arranged at the bottom of reactor 47 via conduit 49 is transport device 50 that routes residue I via conduit 57 into heating device 58. In some embodiments, transport device 50 is a feeder screw coupled with a slurry pump. In some embodiments, heating device 58 is a spiral heat exchanger. Heated residue I is then delivered to separator 60 via conduit 59. Residue I can include spent catalyst, carrier fluid, and residual biomass. Separator 60 separates light gases from the heated residue prior to gravity discharge via conduit 62 into vaporizer device 63. In some embodiments, vaporizer device 63 is a thermal desorption screw controllable to operate at temperatures from low to high temperature thermal desorption up to temperatures typical for pyrolysis (300° C. to 1000° C.). Vaporizer 63 can optionally receive a catalyst slurry G via conduit 73 to form a catalytic reactive residue for enhanced distillate fuel production. Vaporizer 63 also receives a nitrogen gas P from a nitrogen gas production apparatus via conduit 120 to maintain an inert operating environment within the thermal screw to avoid or at least impede oxidation and degradation of the distillate vapor. Vapor H produced by distillation and catalyst cracking within vaporizer 63 can be due to indirect heating, which can be electric, steam or hot thermal fluid, singularly or in combination is then routed to either conduit 65 or conduit 70. Conduit 65 route can be used to further catalyst crack the vapor using catalyst cracking vessel 69. In some embodiments, catalyst cracking vessel 69 is a fixed bed of catalyst within a pressure vessel. Vapor H as flows through the fixed bed of catalyst is catalyst cracked to complement the quality of distillate produced by the present method. Catalyst cracked vapor Q is routed via conduit 68 into a cooling device 71. In some embodiments, cooling device 71 is an aerial cooler. Alternatively vapor H recovered from vaporizer 63 can be routed directly to cooling device 71. From cooling device 71, the condensed distillate H is routed via conduit 72 to separator 54.

In some embodiments, ash residue R recovered from the outlet of vaporizer 63 is routed via conduit 64 into cooling device 76 such that the cooling medium, which can be return thermal fluid or glycol cooling water, is used to cool the ash residue R and to recover thermal energy prior to being routed via conduit 66 into a receiving bin 67. In some embodiments, cooling device 76 is a jacketed thermal screw.

Desulfurized distillate J is routed from storage tank 82 via conduit 83 to transport device 84. In some embodiments, transport device 84 is a centrifugal pump. From transport device 84 desulfurized distillate J is routed via conduit 85 to heating device 122. In some embodiments, heating device 122 is a furnace. In some embodiments, the heating device indirectly heats desulfurized distillate J to temperatures up to 400° C. From the heating device 122 the heated distillate is routed via conduit 123 into fractionation tower 88. Fractionation tower 88 is configured to separate the distillate into the fractions naphtha, kerosene, diesel and carrier fluid. Naphtha distillate K production is promoted using reflux drum such that the gases are collected off the top of fractionation tower 88 and routed via conduit 89 to cooling device 90. In some embodiments, cooling device 90 is an aerial cooler. In some embodiments, the condensed vapors are then routed via conduit 91 into separator 92. Separator 92 releases non-condensable gases via conduit 101 which can be flared or used as fuel gas within the process. Naphtha distillate K that is condensed is routed via conduit 93 to transport device 94 which is configured to split the flow via the use of control valves to recycle a portion of Naphtha distillate K back to fractionation tower 88 via conduit 95. In some embodiments, transport device 94 is a centrifugal pump. The remainder of the Naphtha distillate K is routed via conduit 96 to cooling device 97 for further cooling. From cooling device 97 the cooled distillate is routed into condenser 99 via conduit 98. Conduit 100 is used to route the naphtha distillate K to its storage system. In some embodiments, cooling device 97 is an aerial cooler.

Similarly, kerosene distillate L recovered from fractionation tower 88 is routed via conduit 102 to cooling device 103. In some embodiments, cooling device 103 is an aerial cooler. From cooling device 103 the cooled distillate is routed into condenser 105 via conduit 104. Conduit 106 is used to route the kerosene distillate L to its storage system.

Similarly, diesel distillate M recovered from fractionation tower 88 is routed via conduit 107 to cooling device 108. In some embodiments, cooling device 108 is an aerial cooler. From cooling device 108 the cooled distillate is routed into condenser 110 via conduit 109. Conduit 111 is used to route the diesel distillate M to its storage system.

Arranged at the bottom of fractionation tower 88 is the outlet for the recovery and recycling of the carrier fluid. This carrier fluid is recycled for slurrying, while a portion of the stream, recovered carrier fluid N, is recycled to reactor 47 for direct heating via conduit 56.

Figure 2A:
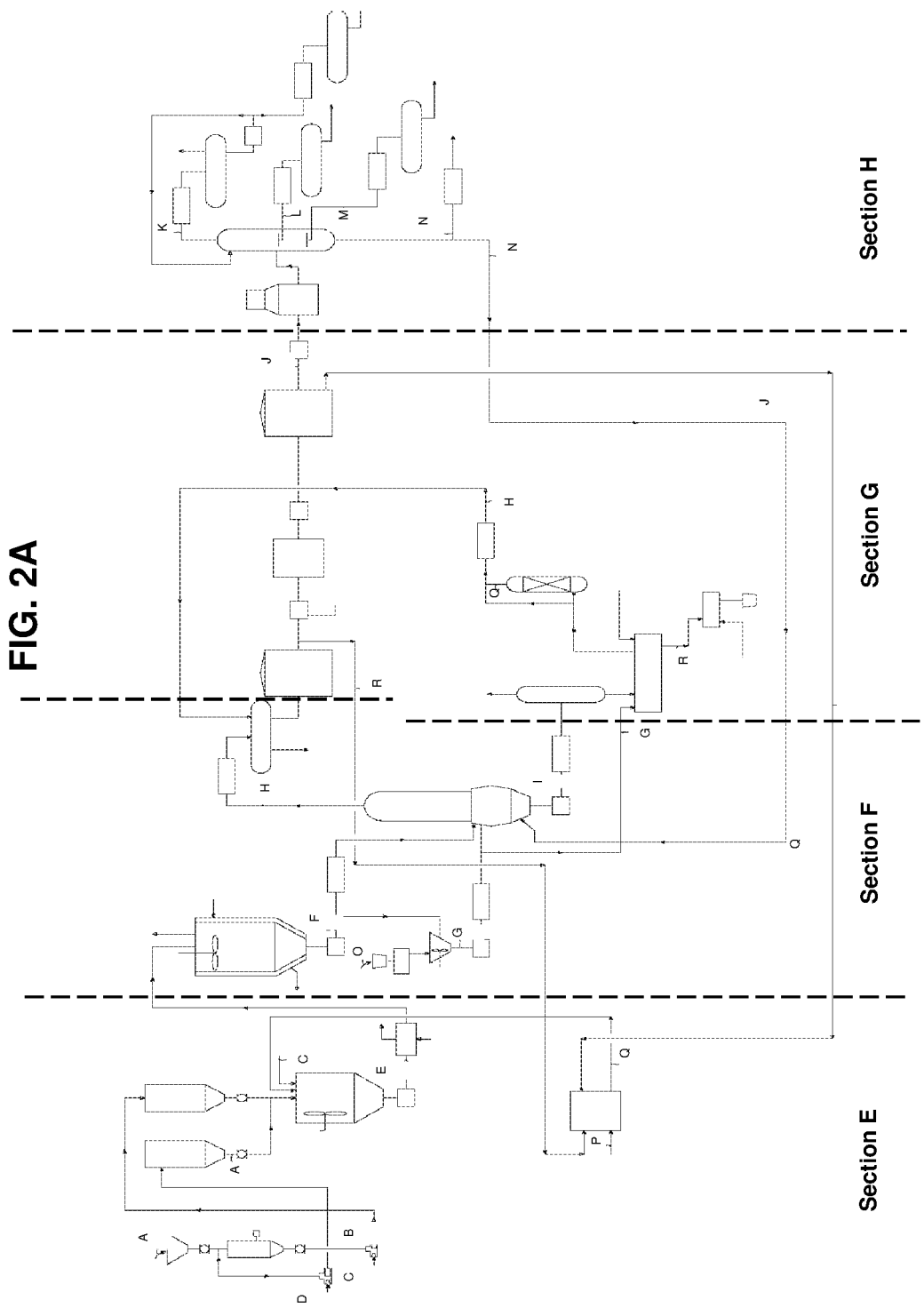
FIG. 2A is a schematic diagram of a second embodiment of an apparatus and method for thermal processing of biomass.
Figure 2B:
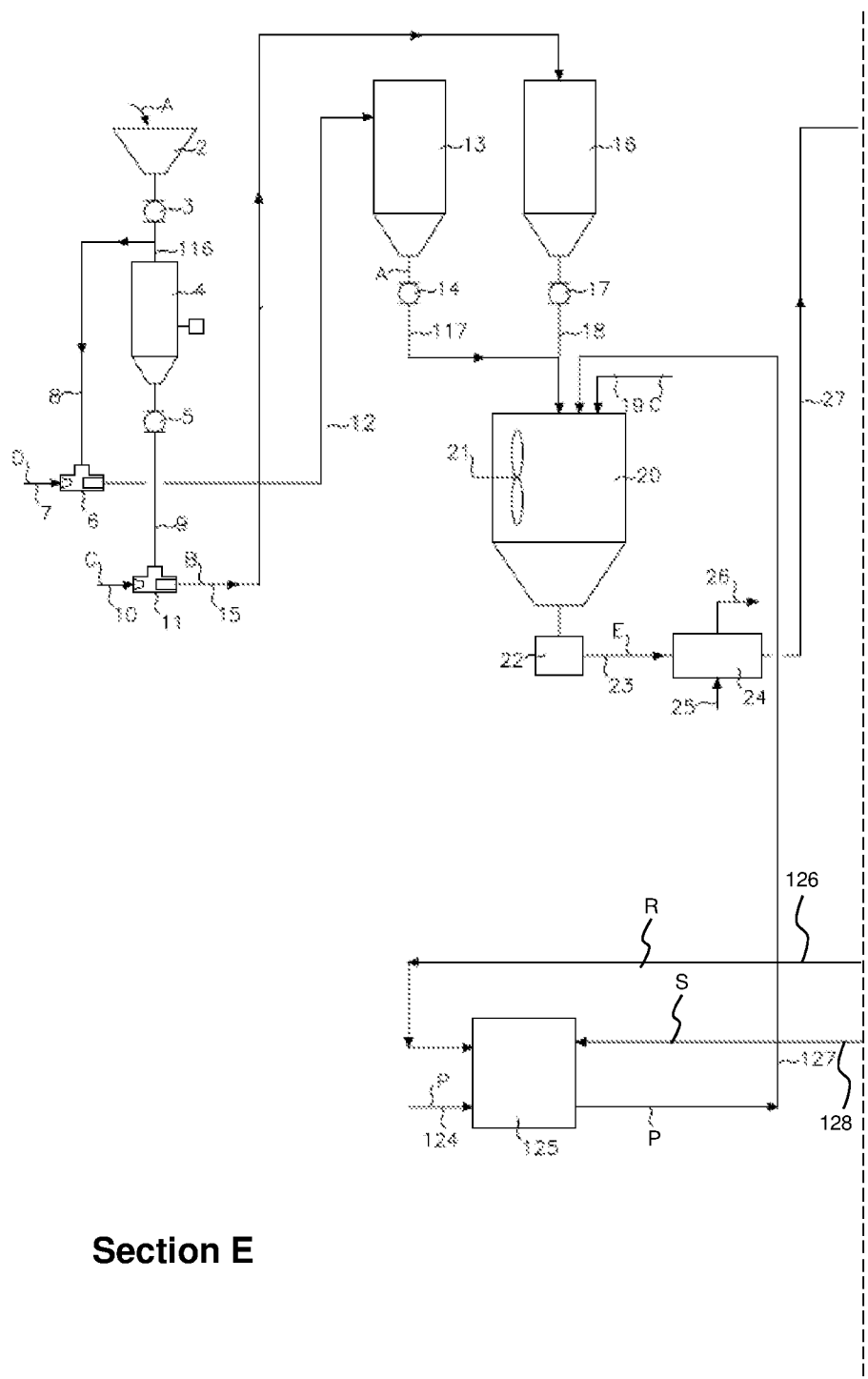
FIG. 2B is an enlarged view of a first section of the schematic diagram of FIG. 2A.
Figure 2C:
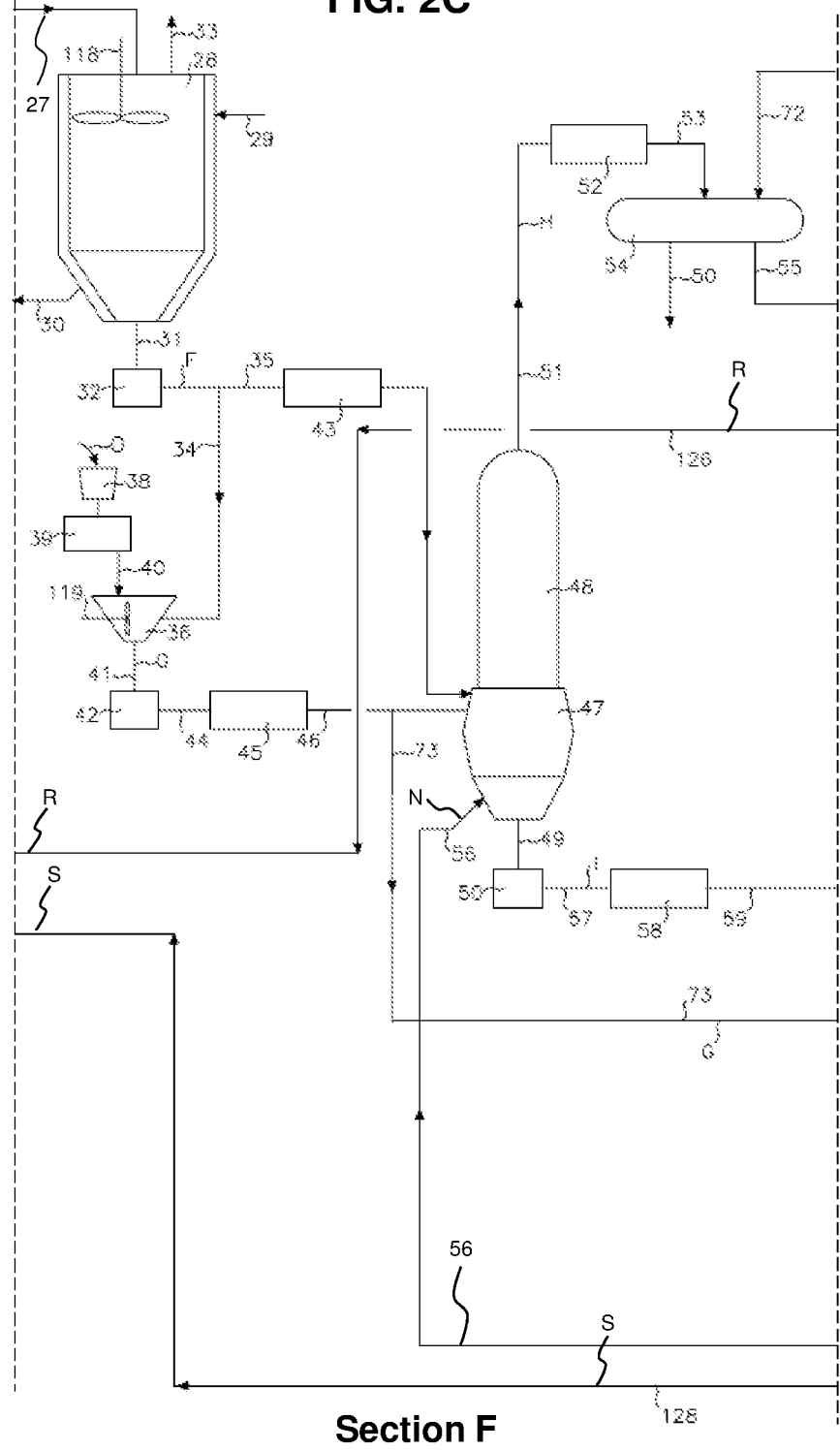
FIG. 2C is an enlarged view of a second section of the schematic diagram of FIG. 2A.
Figure 2D:
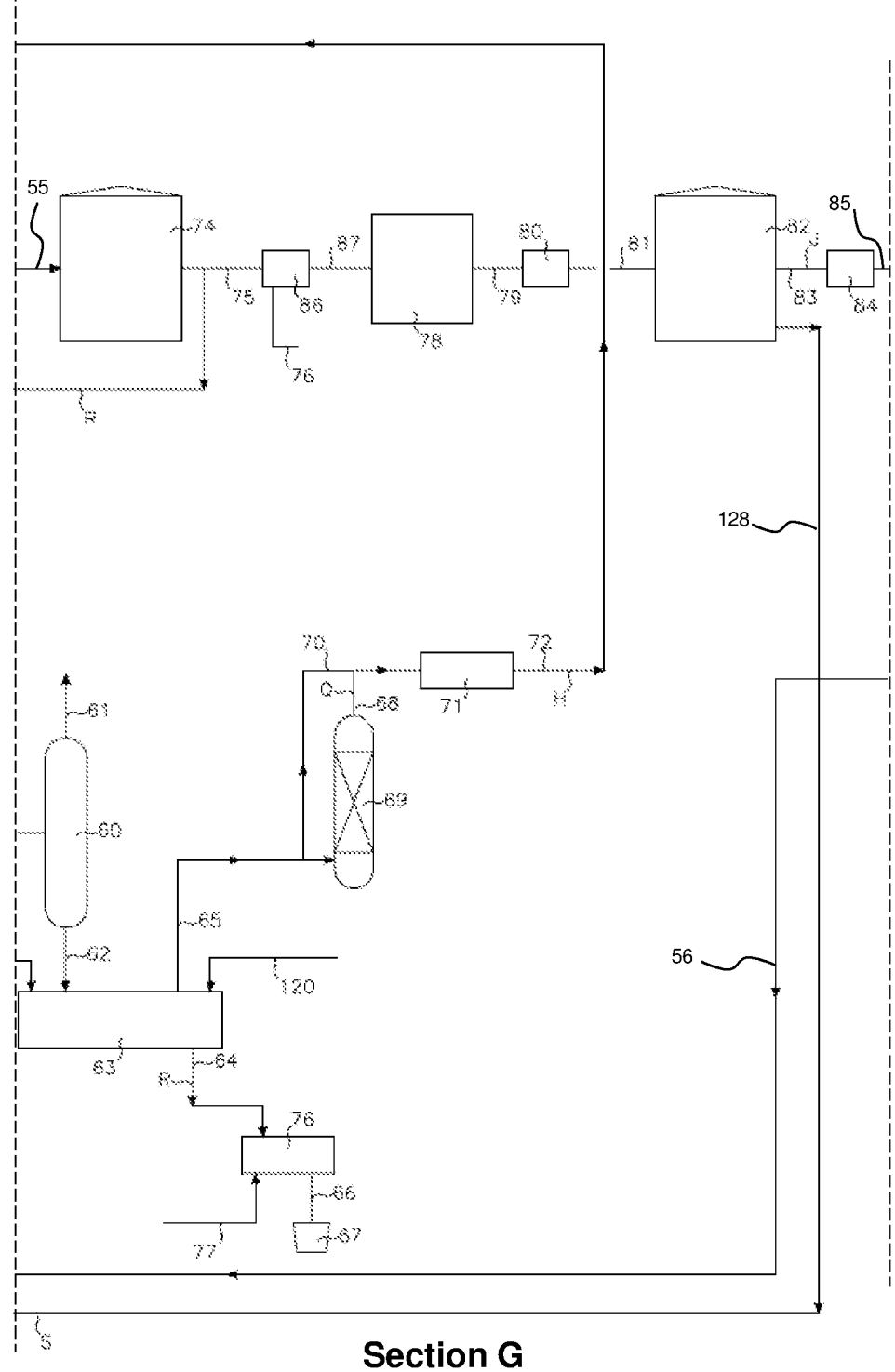
FIG. 2D is an enlarged view of a third section of the schematic diagram of FIG. 2A.
Figure 2E:
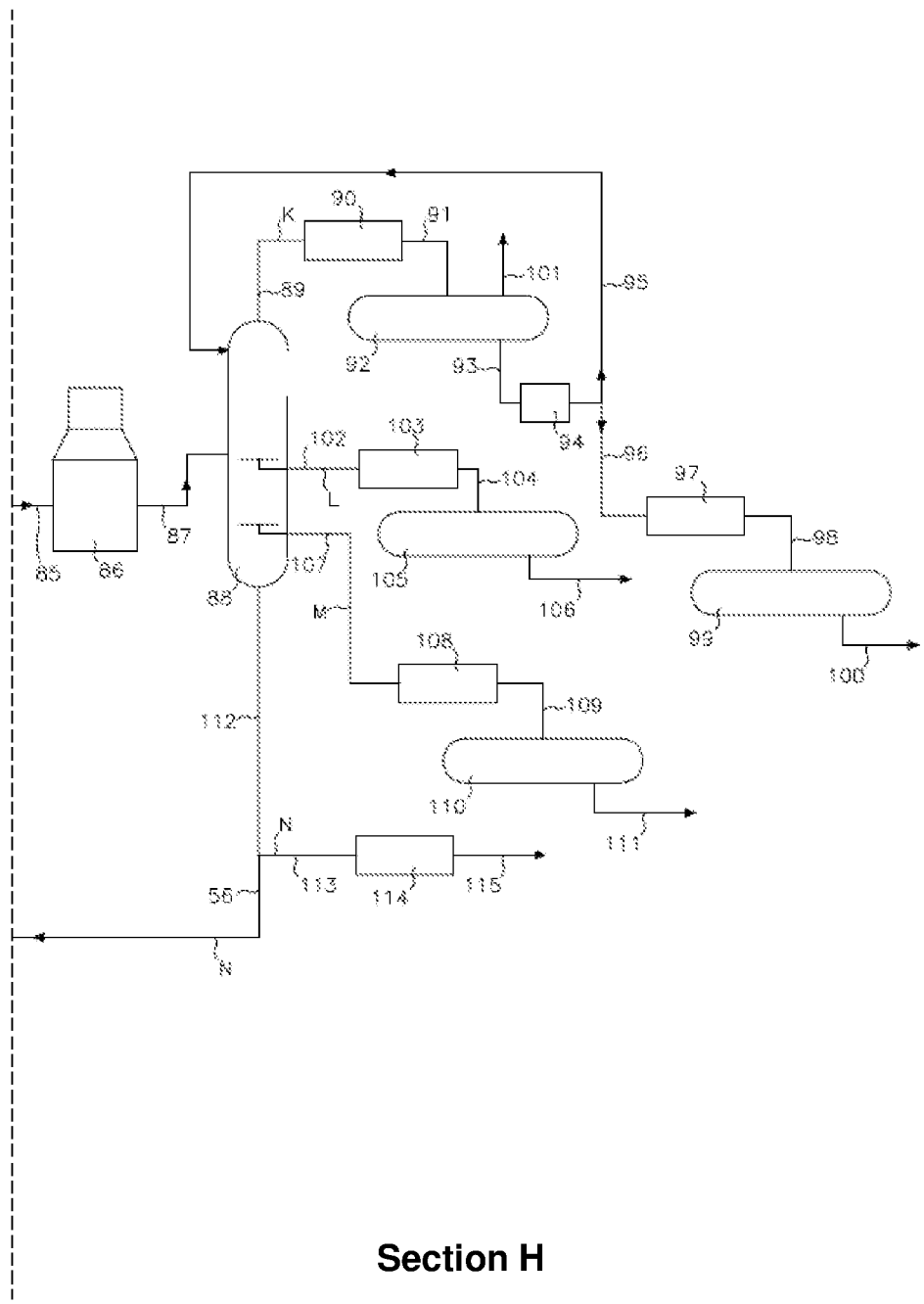
FIG. 2E is an enlarged view of a fourth section of the schematic diagram of FIG. 2A.

Another embodiment of an apparatus and method for thermal processing biomass is shown in the schematic diagram of FIGS. 2A-2E. In at least some embodiments, the described apparatus and method can use a carrier fluid derived from external renewable resources to produce a low carbon intensity renewable fuel.

In some embodiments, the carrier fluid can be derived from mainly, if not entirely, renewable resources and replace oils such as petroleum, vegetable oil, and/or animal fat-based oils.

Distillates produced from renewable resources, such as those produced by the processes and apparatuses described herein and/or acquired from an external source, can to be used as the carrier fluid to slurry biomass and other feedstocks, in lieu of other carrier fluids derived from petroleum-based oils or thermal fluids. In some embodiments, the process and apparatuses described herein can substitute or replace the petroleum-based carrier fluid with a renewable distillate as a slurring agent. In some embodiments, this can be achieved by using an initial charge of renewable diesel distillate obtained from an outside source to slurry the biomass for the production of a renewable distillate. In at least some of these embodiments, once the process produces sufficient volumes of renewable raw distillate, use of the outside source can be discontinued, and a portion of the raw renewable distillate generated by the process can be recycled for use as a carrier fluid.

Renewable distillate P can be delivered to storage tank 125 via conduit 124. In some embodiments, distillate P can be raw or treated distillate. In at least some embodiments, distillate P can be biomass made from biological waste materials derived from industrial operations including, but not limited to, wood residues, sawdust, cellulose from paper production, as well as other substances such as grains, straw, and/or corn. In other embodiments, distillate P can be a diesel and/or kerosene-based distillate.

Distillate P can be delivered to blend vessel 20 via conduit 127 and used as a carrier fluid to slurry biomass A to produce reaction mixture E that can be a homogenous blend of biomass and carrier fluid. In some embodiments, addition of distillate P via conduit 127 can be optional.

In some embodiments, once the present apparatus and method produce sufficient volumes of internal renewable distillates, the use of external renewable distillate P to slurry biomass A can be discontinued and replaced with renewable raw distillate R and/or renewable treated distillate S.

In some embodiments, renewable raw distillate R from storage tank 74 can be recycled and delivered to storage tank 125 via conduit 126. In some embodiments, raw distillate R can be subsequently used as a carrier fluid for biomass slurrying by delivering raw distillate R to blend vessel 20 via conduit 127.

In some embodiments, renewable treated distillate S from storage tank 82 can be recycled and delivered to storage tank 125 via conduit 128. In some embodiments, treated distillate S is delivered following treatment for sulfur removal. In some embodiments, treated distillate S can be subsequently used as a carrier fluid for biomass slurrying by delivering treated distillate S to blend vessel 20 via conduit 127.

In some embodiments, combinations of distillate P, distillate R, and/or distillate S can be used as carrier fluid for biomass slurrying.

In at least some embodiments, recycling distillate R and/or distillate S can create a diesel fuel made from close to, if not entirely, 100% renewable sources.

In at least some embodiments, recycling distillate R and/or distillate S can reduce the amount of contaminates introduced during the production process.

In some embodiments, the present method and apparatus can be used to generate a close to, if not an entirely 100% renewable, low carbon intensity fuel.

Figure 3B:
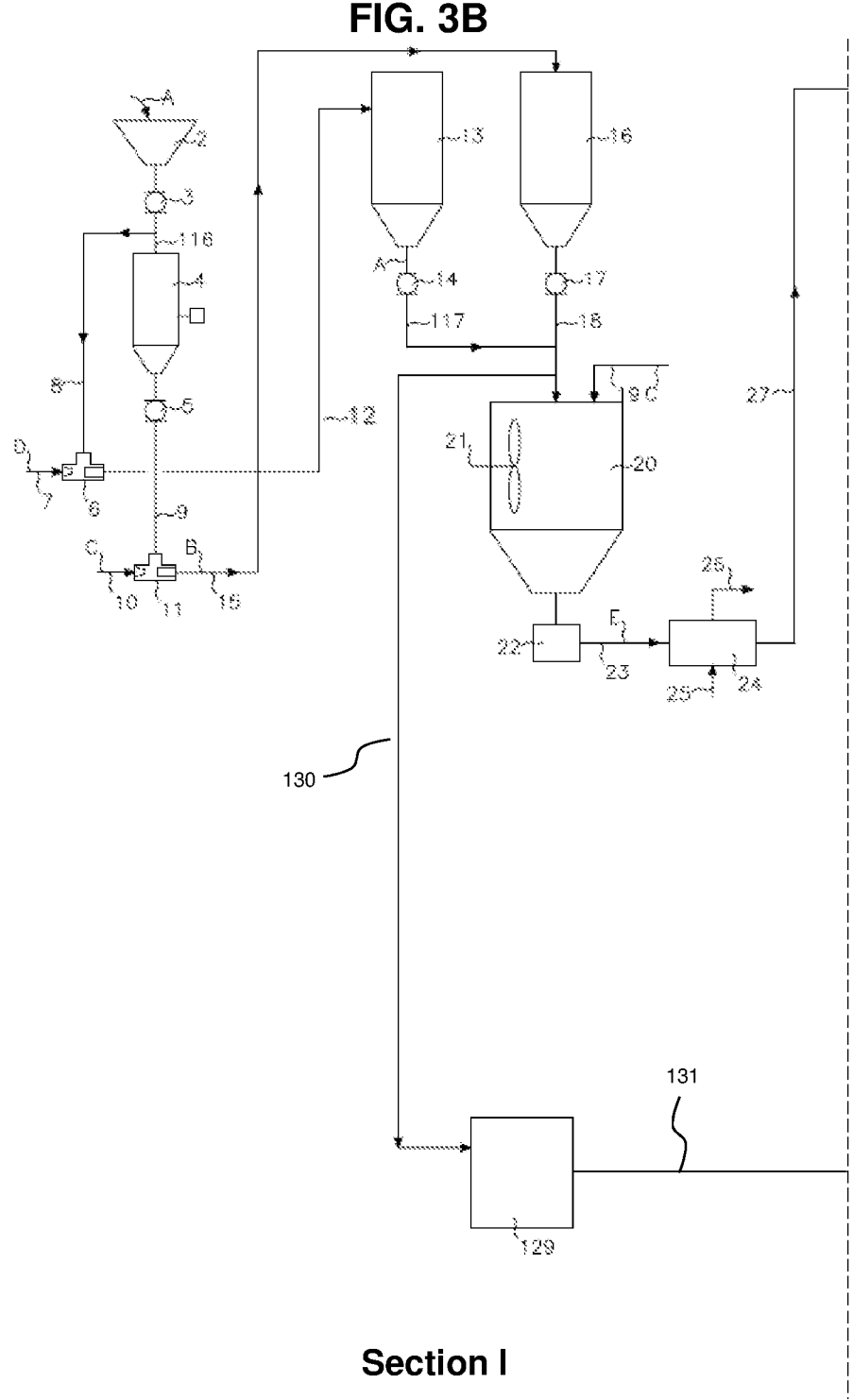
FIG. 3B is an enlarged view of a first section of the schematic diagram of FIG. 3A.
Figure 3C:
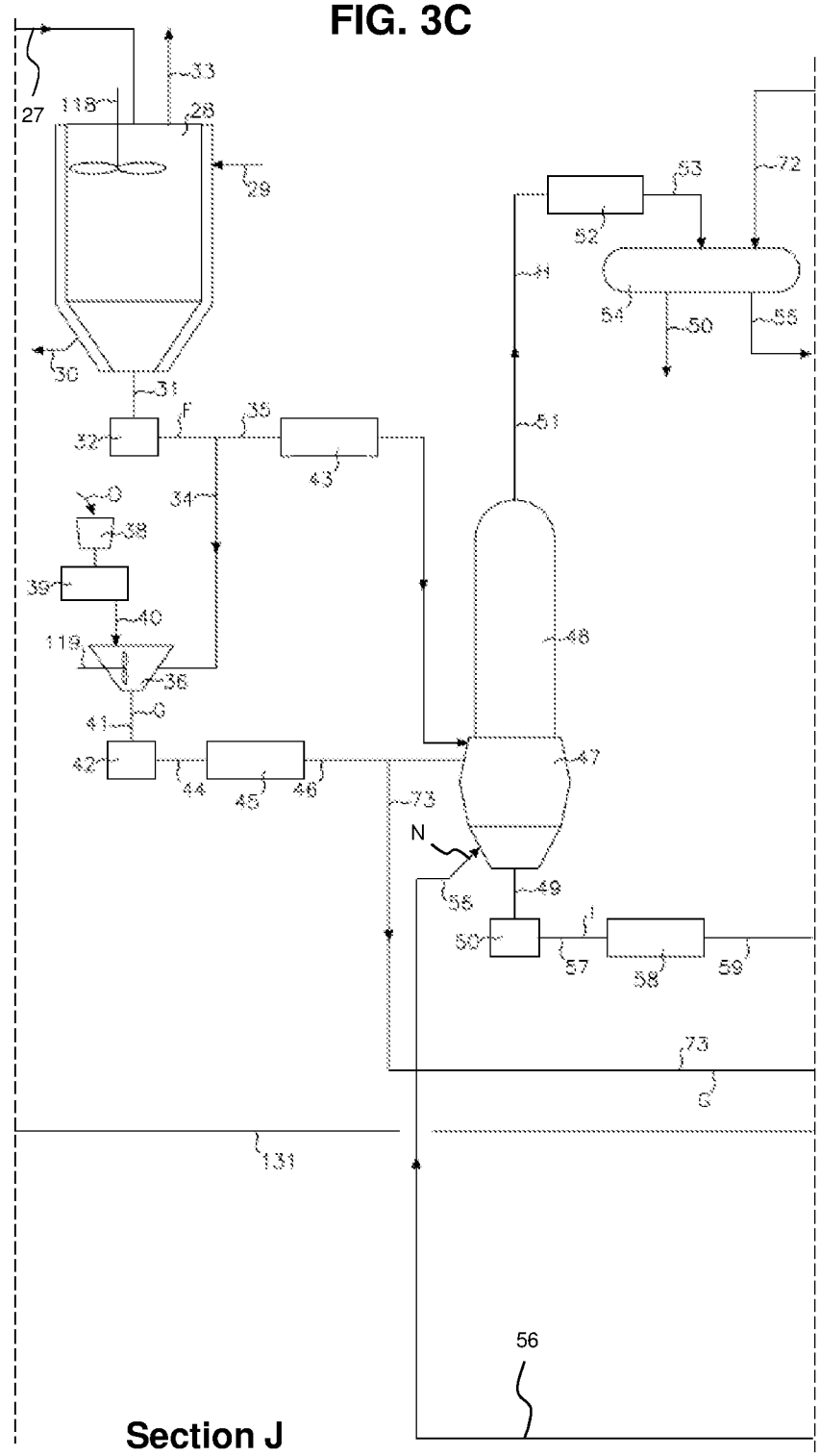
FIG. 3C is an enlarged view of a second section of the schematic diagram of FIG. 3A.
Figure 3D:
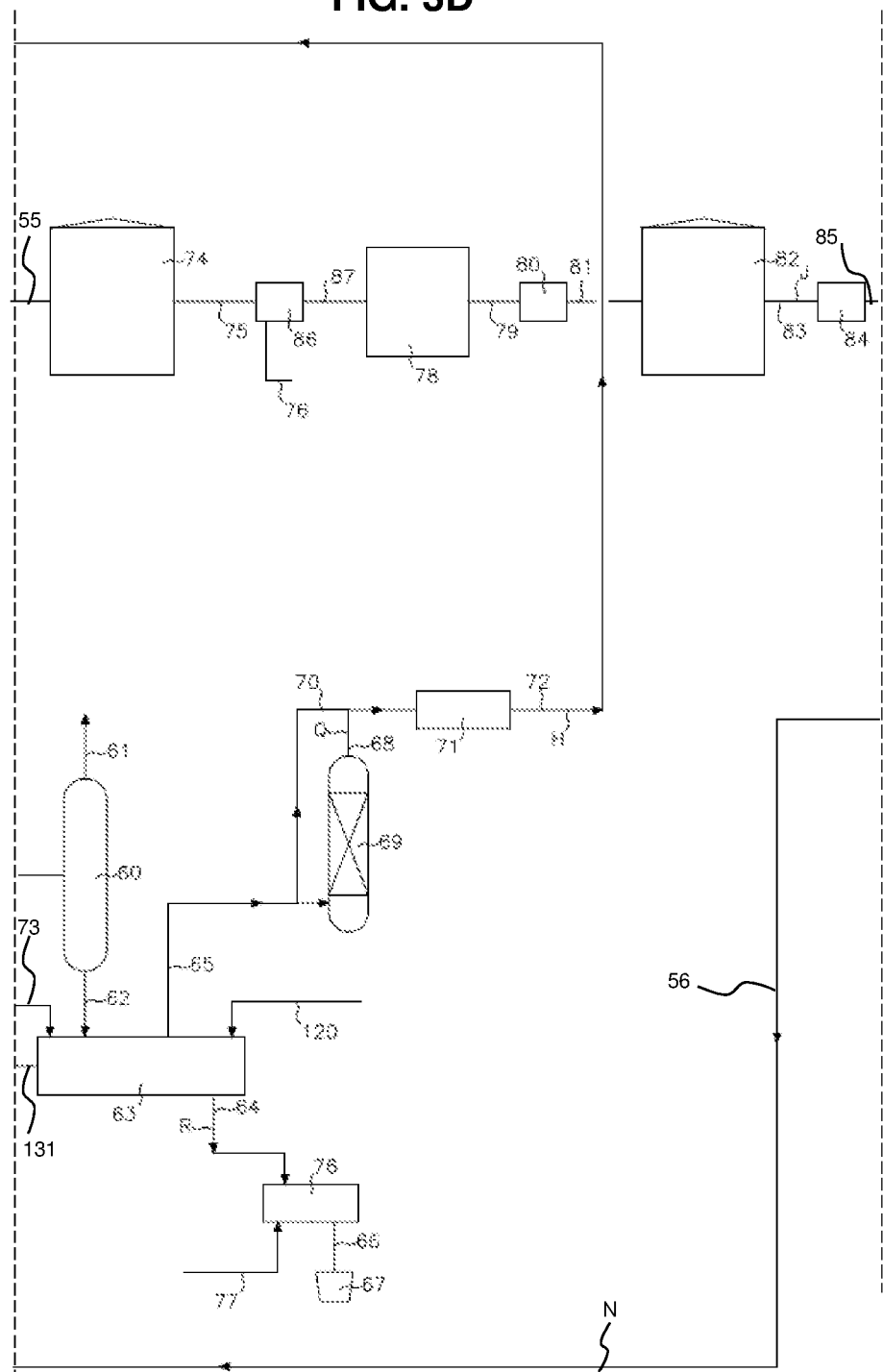
FIG. 3D is an enlarged view of a third section of the schematic diagram of FIG. 3A.
Figure 3E:
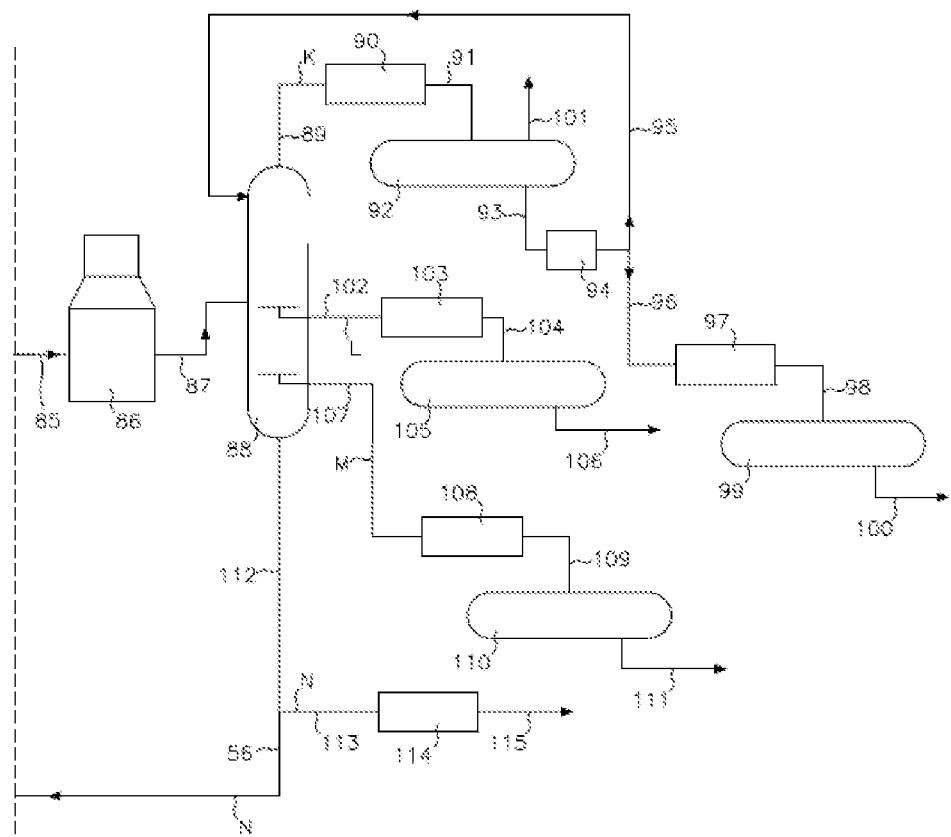
FIG. 3E is an enlarged view of a fourth section of the schematic diagram of FIG. 3A.

Another embodiment of an apparatus and method for thermal processing biomass is shown in the schematic diagram of FIGS. 3A-3E. In at least some embodiments, the described apparatus and method can render unnecessary the use of a carrier fluid by employing a vaporizer to vaporize the biomass. In at least some of these embodiments, the method can include apparatuses with operating temperatures capable of directly vaporizing biomass and/or other feedstocks. In some embodiments, this can be achieved by operating a vaporizer at higher temperatures. In some embodiments, the vaporizer can be operated at temperatures of 200° C.-1200° C. In some embodiments, the vaporizer is operated in an inert environment. In some embodiments, an inert environment can be achieved using an inert gas, such as but not limited to nitrogen, as a blanketing gas. In some preferred embodiments, operating the vaporizer at temperatures greater than 600° C., under non-oxidizing conditions, can vaporize the biomass directly without the use of a carrier fluid.

In some embodiments, the residual waste created by vaporization of biomass can be reduced. In some embodiments, the residual wastes include the hot ash underflow from the vaporizer.

In some embodiments, direct vaporization of biomass and other feedstock can reduce operating costs. In some embodiments, the elimination of a carrier fluid provides significant operating cost savings.

In some embodiments, biomass can be conveyed into a vaporizer via enclosed screw conveyors. In some embodiments, the biomass can be indirectly heated to pyrolysis temperatures. In some embodiments, the pyrolysis temperature is between and inclusive of 600° C.-1200° C. In some embodiments, use of pyrolysis temperatures results in vaporization of 45-85% of the biomass from a solid to a gaseous vapor.

In some embodiments, the vapor can be conveyed into a reactor where the vapor is catalyst cracked using a fixed-bed reactor filled with catalyst. In some embodiments, the vapor can be catalyst cracked as the gaseous vapor flows through a fluidized bed, whereby the catalyst can be suspended in a gaseous stream comprising of an inert gas such as nitrogen.

In some embodiments, a vaporizer can include a reactor whereby the biomass can be indirectly heated under a non-oxidizing environment using an inert gas such as nitrogen. In some embodiments, the vaporizer can be a thermal screw designed to operate at temperatures between and inclusive of 200° C.-1200° C. for continuous operation or as reactors with mixers equipped with heating jackets for batch operation. In some embodiments, the heating medium(s) for indirect heating of the biomass can be, among other things, hot combustion gases, steam and/or heat generated by the use of electric heating elements. In at least some embodiments, the heating medium(s) is/are capable of heating the biomass to temperatures of at least 1200° C.

In some embodiments, vaporization of biomass can reduce the quantity of residual waste through the distillation and vaporization of the volatile organic fraction in the underflow produced by the catalytic depolymerization reactor, leaving the inserts and heavy distillate fractions for disposal.

In some embodiments, the vaporizer at operating temperatures between and inclusive of 200° C.-1200° C. can vaporize residual biomass and carrier fluid. In some embodiments, in the absence of a catalyst, the vaporizer can be used to distill and vaporize oil and/or distillate-based carrier fluids such that they can be recovered and recycled, while simultaneously reducing the quality and volume of waste requiring third party disposal.

In some embodiments, the vaporizer can be used to vaporize residual biomass that is not converted into a distillate vapor in the catalytic depolymerization step, increasing the overall yield of the process. In some embodiments, a catalyst can be added directly to the biomass, mixed with or without a carrier fluid. In some embodiments, the gaseous vapor produced in operation of the vaporizer can be treated with a catalyst using either a reactor with fixed bed of catalyst media or a fluidized bed whereby the catalyst is suspended using an inert gas for contact with the gaseous vapor. In some embodiments, the gaseous vapor can be optionally catalyst cracked for the production of distillate or alternatively cooled and condensed for the recovery of the carrier fluid, depending on the selected application and mode of operation.

In some embodiments, biomass A can be delivered from storage vessel 13 and/or 16 to screw conveyor 129 via conduit 130 and then transferred to vaporizer 63 via conduit 131.

In at least some embodiments, use of conveyor 129 can be used to bypass apparatuses up to but not including separator 54, thereby removing the need for a carrier fluid to treat biomass A.

In some embodiments, vaporizer 63 can include electric heating elements. In some embodiments, the heating elements of vaporizer 63 can be mounted on the outer shell of vaporizer 63 to indirectly heat biomass A to temperatures up to and including 1200° C. In a least some embodiments, at temperatures between and inclusive of 200° C.-1200° C., biomass A can be converted from a solid to a vapor.

In some embodiments, vaporization and catalyst cracking of biomass A can occur in vaporizer 63. In at least some of these embodiments, vapor can be delivered via conduit 65 to catalyst cracking vessel 69 for further catalyst cracking. In some embodiments, a renewable distillate vapor can be produced via catalyst cracking the vapor in vaporizer 63 and/or catalyst cracking vessel 69.

In some embodiments, vaporizer 63 is configured to independently operate the process of receiving catalyst G via conduit 73 from the process of receiving biomass A via conduit 131.

In some embodiments, vaporization rather than carrier fluid treatment of biomass A can lower production costs.

Figure 4A:
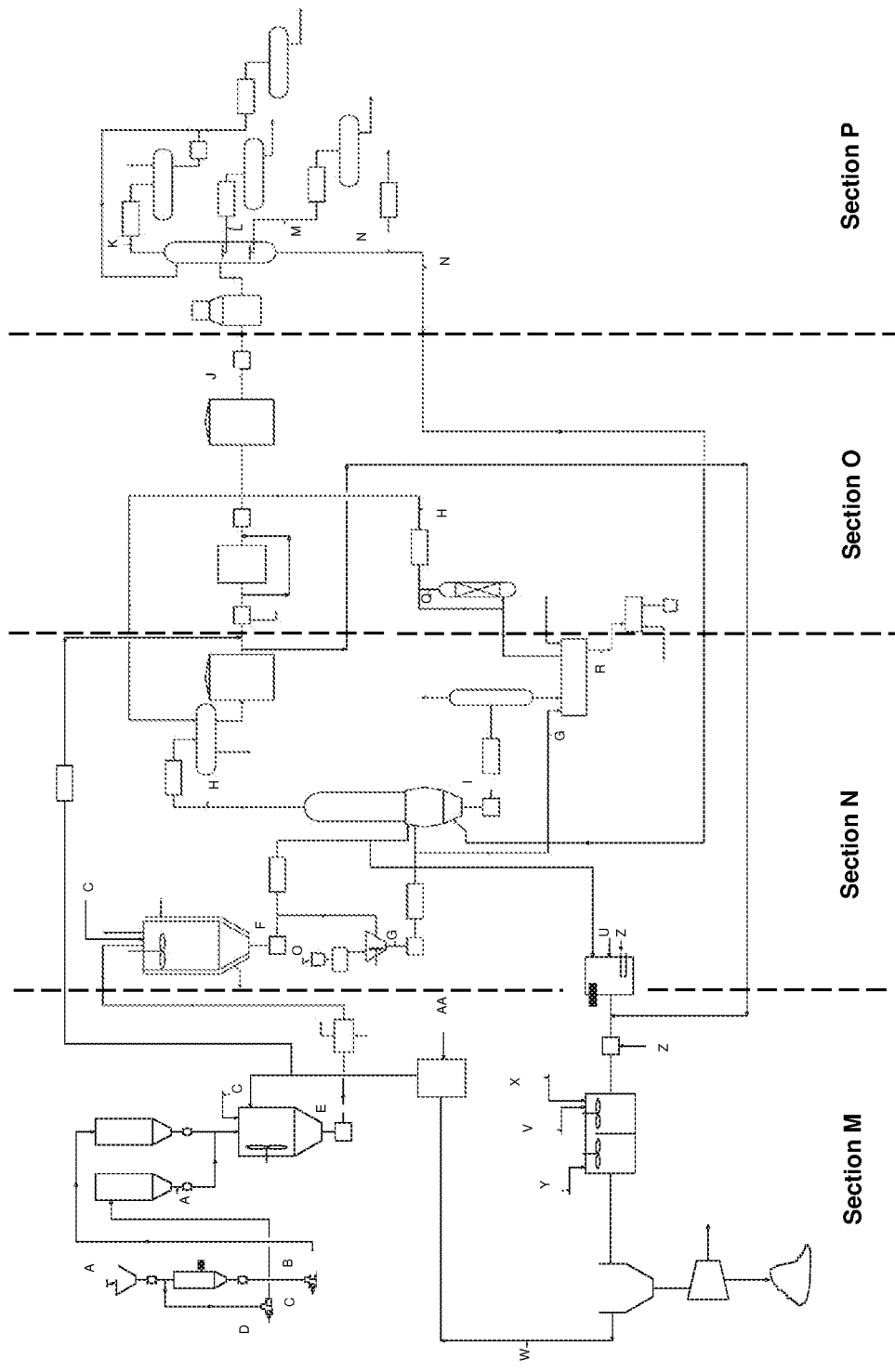
FIG. 4A is an enlarged view of a schematic diagram of a fourth embodiment of an apparatus and method for thermal processing of biomass.
Figure 4B:
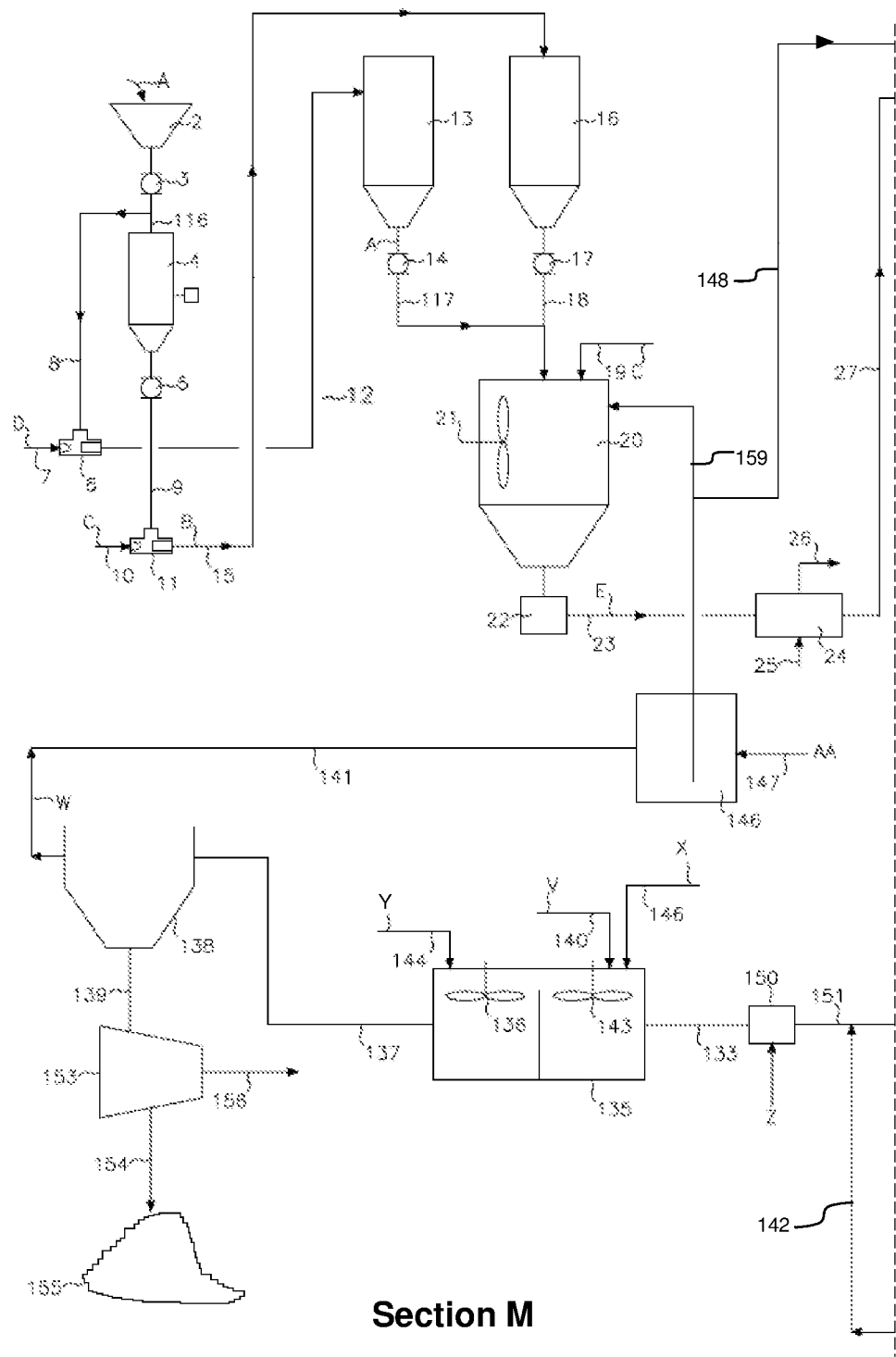
FIG. 4B is an enlarged view of a first section of the schematic diagram of FIG. 4A.
Figure 4C:
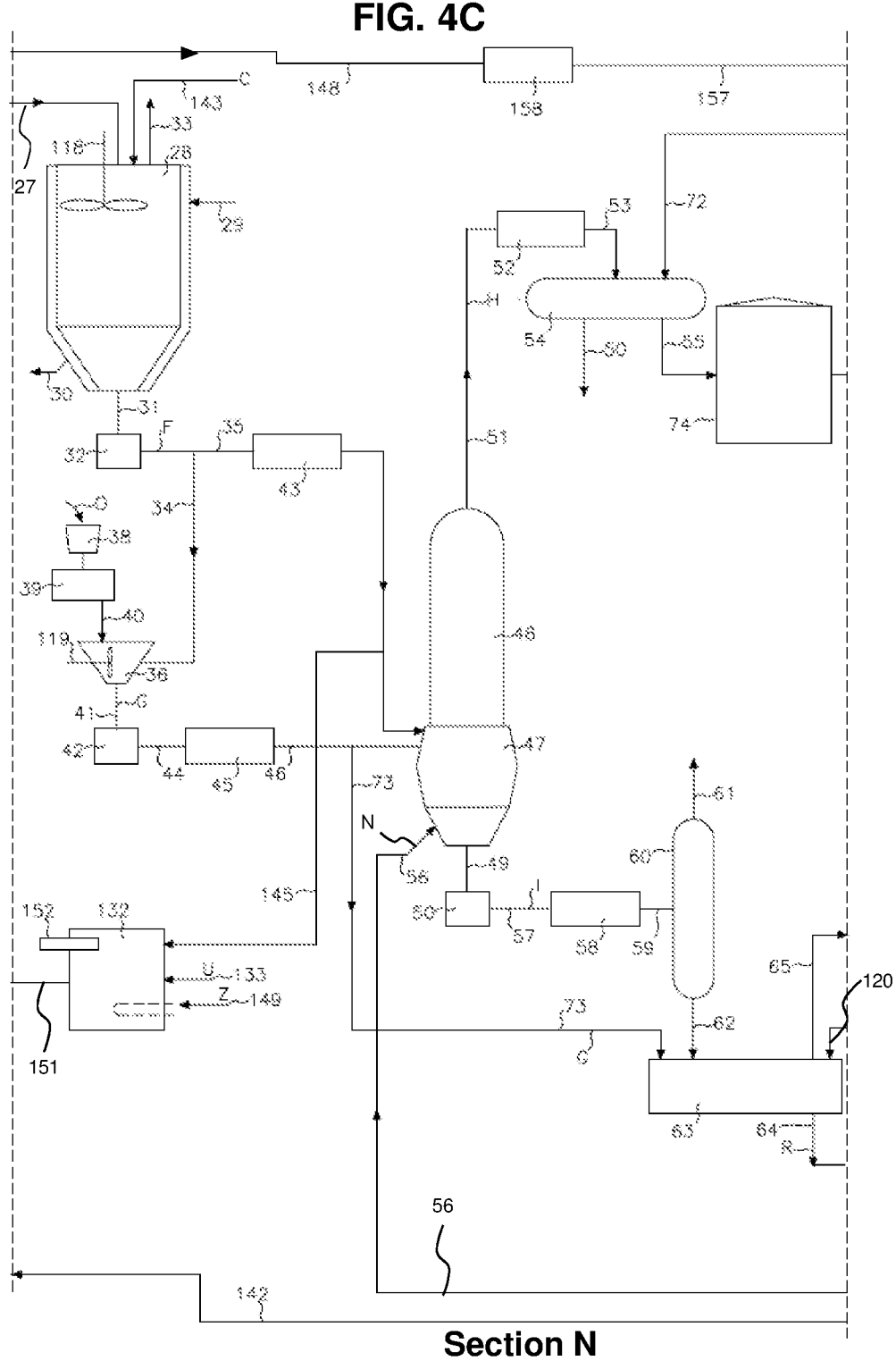
FIG. 4C is an enlarged view of a second section of the schematic diagram of FIG. 4A.
Figure 4D:
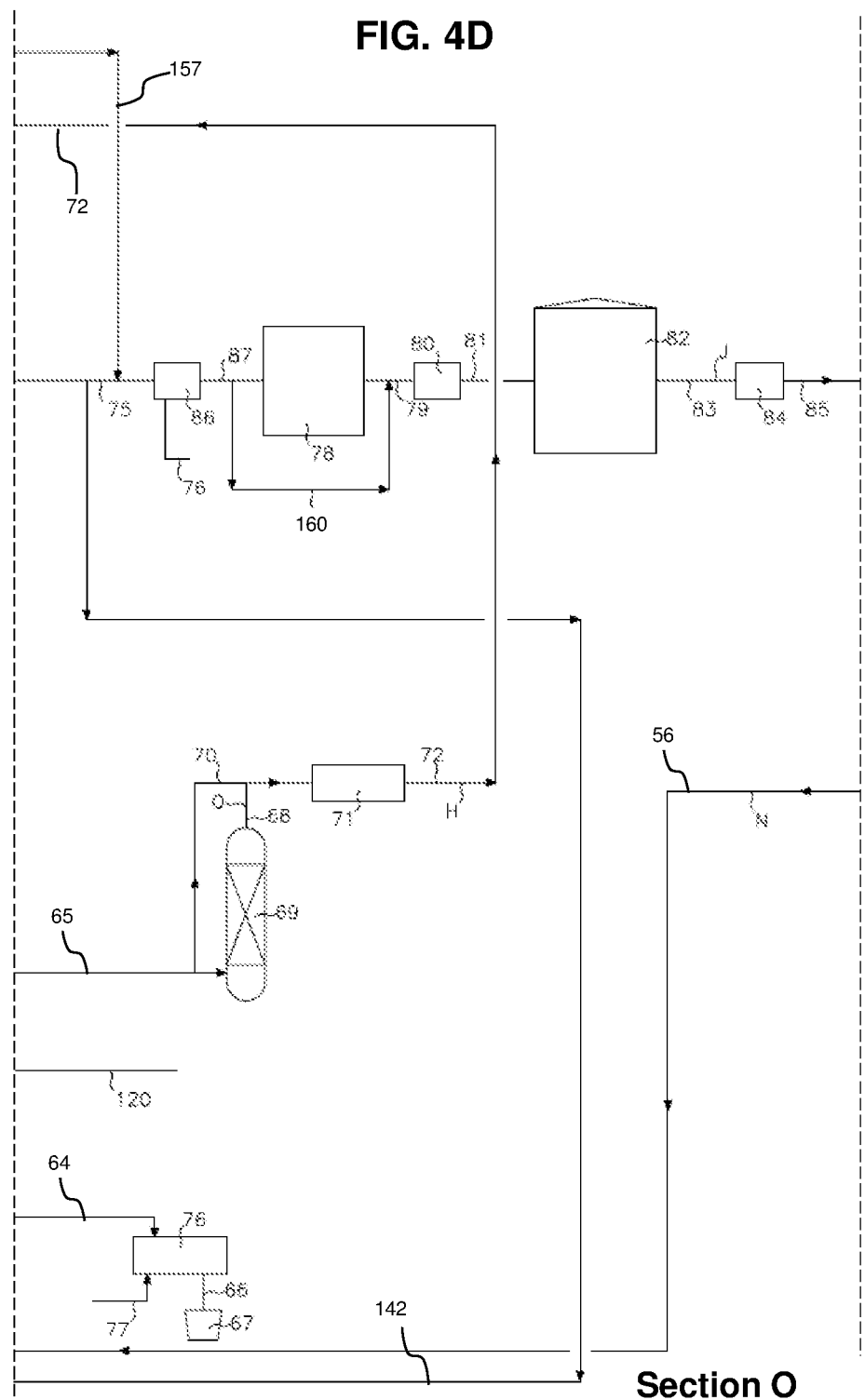
FIG. 4D is an enlarged view of a third section of the schematic diagram of FIG. 4A.
Figure 4E:
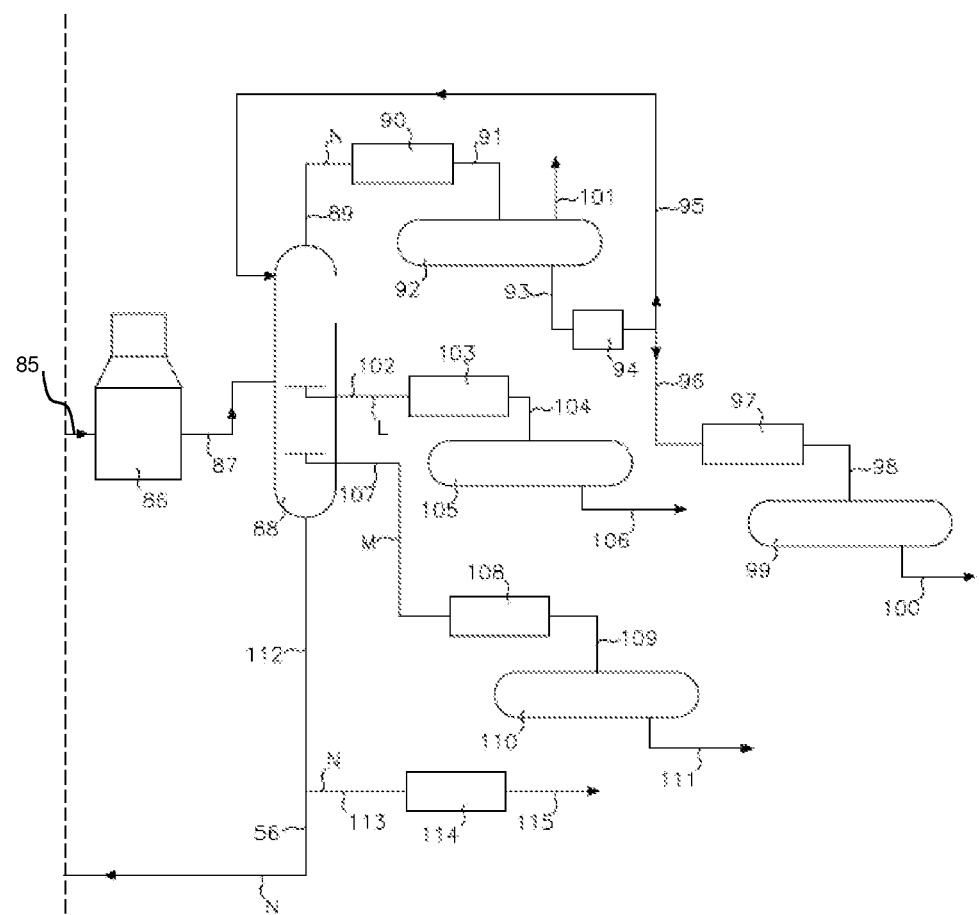
FIG. 4E is an enlarged view of a fourth section of the schematic diagram of FIG. 4A.

FIGS. 4A-4E illustrate an embodiment of an apparatus and method for thermal processing biomass that can desulfurize and treat carrier fluids to remove potential sulfur contaminants from carrier fluids. Sulfur and other contaminants can be present in carrier fluids derived from industrial waste processes such as used motor oil or other external distillates. In some embodiments, desulfurization of carrier fluids can be performed on external (carrier fluids from outside sources) or internal (carrier fluids derived from within the process) carrier fluids which can include recovered motor oil from the fractionation step and/or raw distillate recycled for use as a carrier fluid for the production of a renewable distillate. Desulfurized and treated carrier fluids can be used to slurry feedstock including biomass A.

In some embodiments, desulfurization of carrier fluid can reduce the contaminant load on subsequent process components including desulfurization unit 78. Desulfurization of carrier fluid can remove, or at least reduce, contaminates including but not limited to sulfur, metals, salts, aromatics, mercaptans, and suspended solids. In some embodiments, contaminates are recovered as a waste by-product sludge that can contain a range of solids from 10-35% by weight.

In some embodiments, desulfurization of carrier fluids can involve steps of filtration, heating, chemical and/or clay treatment, sedimentation and/or neutralization, whereby the process steps can be conducted independently or in conjunction with other process steps depending on the type and level of contaminates to be removed. In some embodiments, chemical treatments can involve acids, bases, and/or caustic chemicals.

In some embodiments, oil-based carrier fluids derived from industrial wastes can undergo filtration and heating to remove debris, water, suspended solids, and/or water. In some embodiments, oil-based carrier fluids derived from industrial wastes do not undergo filtration and heating to remove debris and can immediately undergo desulfurization and chemical treatment to remove contaminants including, but not limited to, metals, salts, acids, aromatics, asphaltenes, and sulfur.

In some embodiments, treatment can involve acid or caustic treating through the mixing of sulfuric acid or caustic chemicals, including but not limited to sodium hydroxide, with the carrier fluid resulting in the partial or complete removal of unsaturated hydrocarbons, sulfur, nitrogen, oxygen compounds and resinous and asphaltic compounds. In at least some embodiments, treatment can improve the color, stability, odor and carbon residue of the oil.

In some embodiments, mixing sulfuric acid and/or a caustic with oil-based carrier fluids can form a by-product of sludge that settles out of the oil. In some embodiments, the sludge can be gravity separated from its bulk fraction and centrifuged to produce a stackable waste the can be disposed. In at least some embodiments, the remaining slightly acidic oil can be either filtered and/or mixed with active fuller's earth (also known as clay) to remove mercaptans and additional sulfur. In some embodiments, when clay is mixed with the carrier fluid, impurities are gravity settled as a sludge, resulting in further contaminant reduction.

In various embodiments of the method, treatment and desulfurization can be employed separately in the treatment of carrier fluids, including those derived from industrial processes, or used in conjunction with desulfurization by selective adsorption when treating raw distillates. In some embodiments, when used in conjunction with desulfurization by selective adsorption, the desulfurization and decontamination method can first remove the bulk of sulfur contamination and desulfurization by selective adsorption can then serve as a polishing step. In some embodiments, this multi-step process of desulfurization, decontamination by chemical treatment, and desulfurization by selective adsorption can reduce the sulfur content in the distillate to levels such that the distillate meets sulfur diesel fuel manufacturing standards.

In some embodiments, desulfurization of carrier fluid lowers manufacturing costs by reducing the size and/or quantity of equipment and materials needed for desulfurization by selective adsorption process.

In some embodiments, desulfurization and/or chemical treatment of carrier fluid to remove the bulk of the sulfur contamination from a carrier fluid and/or from a raw distillate can reduce the sulfur loading on the selective adsorption process. In at least some embodiments, this can result in longer run times and/or greater media service life of the selective adsorption process.

Carrier fluid U can be imported into the process from external sources via conduit 133 and stored in storage tank 132. In some embodiments, storage tank 132 can include a flat bottom circular tank equipped with or without an internal floating roof capable of reducing emissions from the tank.

In some embodiments, storage tank 132 can include a heating element such as internal heating coil 149 that houses heating medium Z. Heating medium Z can be a fluid or gas distributed through heating coil 149 that functions to indirectly heat carrier fluid U in storage tank 132.

In some embodiments, storage tank 132 can be equipped with electric heater(s) 152 that function to directly heat carrier fluid U in storage tank 132.

Heating coil 149 and/or electric heaters 152 can be used to heat and maintain carrier fluid U at a temperature between and inclusive of 60° C.-90° C. In some preferred embodiments, the temperature of carrier fluid U prior to entry into conduit 151 is approximately 70° C.

In some embodiments, storage tank 132 can receive recovered carrier fluid recycled from the process via conduit 145, following water removal in heating vessel 28.

In some embodiments, carrier fluid is not heated in storage tank 132 and can be delivered to heat exchanger 150 via conduit 151. In some embodiments, suitable heat exchangers can include those with a shell and tube, spiral, and/or double pipe design.

In some embodiments, heat exchanger 150 can receive raw distillate from conduit 142.

Heat exchanger 150 can utilize a fluid or gas heating medium Z to heat raw distillate, external carrier fluid, and/or internal carrier fluid. In some embodiments, heat exchanger 150 can include in-line electric heaters. In some embodiments, heating medium Z and/or the electric heaters can be used to heat and maintain carrier fluid U at a temperature between and inclusive of 60° C.-90° C.

In some embodiments, heated carrier fluid can be delivered to mix tank 135 via conduit 133. Mix tank 135 can be comprised of single or multiple mix compartments equipped with mechanical mixer(s). In particular embodiments, mix tank 135 can include a first compartment with mechanical mixer 143 and a second compartment with mechanical mixer 136.

In some embodiments, as the carrier fluid passes from the first compartment to the second compartment, the rate and/or force of mixing can be reduced to allow solids and other precipitates and flocculates to settle via gravity sedimentation.

In some embodiments, carrier fluid in mix tank 135 can be injected with chemicals and/or additives. In some embodiments, carrier fluid is injected with acid X via conduit 146, base V via conduit 140, and/or additive Y via conduit 144. In some embodiments, acid X can be a strong acid such as, but not limited to, sulfuric acid with a concentration strength between and inclusive of 30%-90%. In some or the same embodiments, base V can be a strong base such as, but not limited to, soda ash, sodium hydroxide, or lime with a concentration strength between and inclusive of 30%-90%. In some embodiments, additive Y can be a clay that functions to trap and absorb contaminates as well as aid flocculation and sedimentation of the sludge.

The type, concentration, and combination of acid X, base V, and additive Y can be selected based on the nature of contaminates to be removed from the carrier fluid. In some embodiments, contaminates in the carrier fluid can react with acid X, base V, and/or additive Y to produce a sludge containing a concentrated slurry.

In some embodiments, the concentrated slurry is delivered from mix tank 135 to gravity sedimentation tank 138 via conduit 137. In sedimentation tank 138, solids in the concentrated slurry settle to the bottom of tank. In some embodiments, the sludge that settles to the bottom of sedimentation tank 138 can contain a range of solids from 10-35% by weight.

In some embodiments, the sludge can be delivered to dewatering unit 153 via conduit 139. In at least some embodiments, dewatering unit 153 functions to remove free liquid from the sludge to produce solid waste 155 that can be removed from the system via conduit 154 for disposal. In some embodiments, dewatering unit 153 can include a solid bowel centrifuge, dewatering screw conveyor, and/or dewatering press. In at least some embodiments, liquid removed from the sludge can removed via conduit 156 and then recycled into the process and/or disposed.

In some embodiments, the supernatant W of the concentrated slurry can overflow via a weir within sedimentation tank 138 and then be delivered to reactor 146 via conduit 141.

In some embodiments, chemical additive AA can be injected into reactor 146 via conduit 147 and mixed with the incoming supernatant. In at least some embodiments, additive AA can be, among other things, soda ash, lime, sodium hydroxide or other suitable caustic chemicals that function to neutralize the desulfurized supernatant in reactor 146. In some embodiments, the desulfurized and treated carrier fluid can be delivered to blend vessel 20 via conduit 159 to slurry biomass A or other feedstock.

In a particular embodiment of the above-described apparatus and method, raw distillate can be desulfurized to reduce the sulfur and contaminate load of raw distillate. In some embodiments, such desulfurization can reduce the subsequent sulfur loading onto desulfurization device 78. Distillate treated and recovered as described above can be delivered from reactor 146 to cooler 158 via conduit 148.

In some embodiments, cooler 158 can be an aerial cooler that functions to reduce the temperature of distillate to less than or equal to 45° C. In some embodiments, desulfurized and cooled distillate can be returned to the process via conduit 157.

In at least some embodiments, distillate passed through cooler 158 does not require additional sulfur-removal treatment. In some of these embodiments, the desulfurized and treated distillate can bypass desulfurization device 78 via conduit 160.

In some embodiments, such as when the distillate requires further sulfur removal, distillate can be delivered to heating device 86 via conduit 75 and desulfurization device 78 via conduit 87. In some of these embodiments, desulfurization device 78 can act as a polishing step for sulfur removal.

In some embodiments, carrier fluid C can be utilized and added to blend vessel 28 via conduit 143. In some embodiments, carrier fluid C can be a renewable distillate. In at least some of these embodiments, carrier fluid C functions as a temporary distillate source until the process produces raw renewable distillate that can be recycled as carrier fluid. Such a starting distillate source can be used for producing low carbon intensity renewable fuel.

In some embodiments, raw distillate can bypass desulfurization and be directly introduced as carrier fluid into blend vessel 28 via conduit 143.

The method described herein to desulfurize carrier fluid does not require every step depending on the application, source of the carrier fluid, and/or degree and nature of contaminates. The steps of the method can be conducted separately, in combination and suitable derivations thereof.

For example, in some embodiments, the method can include treatment of carrier fluid with acid X, mixing in mix tank 135, gravity sedimentation in tank 138, and/or dewatering in unit 153.

Some embodiments of the apparatus and method can include treatment of carrier fluid with base V, mixing in mix tank 135, gravity sedimentation in tank 138, and/or dewatering in unit 153. In some embodiments, treatment of carrier fluid using additive Y and neutralization using chemical AA can be optional.

Some of the embodiments of the apparatus and method described herein can produce a distillate that can be subsequently used to manufacture renewable, low-sulfur diesel fuel and/or other fuel distillates including, but not limited to, kerosene that can be used to power automobiles, boats, planes, trains, and/or power generation equipment. Such embodiments can be used to produce naphtha which can be used in industrial applications including as diluent for heavy oil transportation.

The present method can operate using feedstock materials other than biomass. Waste plastics typical of sorted municipal solid waste can also be substituted for biomass and found to produce distillate oil that can be used for fuel production.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A method of thermal processing and catalytic cracking of a biomass, the method comprising the steps of:
    (a) slurrying said biomass within a first carrier fluid to create a reaction mixture; dehydrating said reaction mixture to remove and recover an amount of water;
    (b) slurrying a first catalyst within a second carrier fluid to create a catalyst slurry, heating separately said reaction mixture and said catalyst slurry to different temperatures that once added together within a reactor, said catalyst slurry and said reaction mixture form a catalytic active biomass slurry, wherein said catalytic active biomass is at a temperature above a catalyst activation temperature of said first catalyst to immediately initiate catalytic cracking;
    (c) directing a residual reaction mixture, wherein said residual reaction mixture is made up of a portion of said catalytic active biomass slurry, to a vaporizer for thermal processing, whereby an additional catalyst is optionally added to said residual reaction mixture whereby a resulting vapor is optionally further exposed to a different catalyst type using a different method of catalyst addition to enhance a quality and a composition of a distillate; and
    (d) distilling via thermal processing a carrier fluid portion containing a plurality of residuals by said vaporizer to enable said carrier fluid portion to be recycled as a liquid for slurrying or direct heating, while optionally catalytically cracking said carrier fluid portion containing said plurality of residuals for enhanced production of a distillate oil.

2. The method of claim 1, further comprising, in said residual reaction mixture recovered from an underflow of a catalytic depolymerization unit, the step of subjecting said residual reaction mixture to further thermal processing thereby increasing a conversion ratio of said biomass to said distillate.

3. The method of claim 1, wherein said first carrier fluid is employed to slurry said biomass, thereby permitting pumping and transport of said biomass within said first carrier fluid.

4. The method of claim 1, wherein an apparatus slurries said biomass with said first carrier fluid and wherein said biomass is ground.

5. The method of claim 1, wherein an apparatus thermally processes said plurality of residuals for vaporization.

6. The method of claim 5, wherein said vaporization is performed in the range of about 300° C. to about 1000° C.

7. The method of claim 1, wherein an apparatus adds said first catalyst directly to said reaction mixture.

8. The method of claim 1, further comprising the step of dewatering said reaction mixture.

9. The method of claim 1, further comprising the step of desulfurizing said distillate oil.

10. The method of claim 1, further comprising the step of storing said distillate oil.

11. The method of claim 1, further comprising the step of operating said vaporizer at temperatures to cause the distillation of said carrier fluid to separate said carrier fluid from a plurality of solid fraction, thereby allowing said distillate to be cooled and condensed to facilitate recycling of said distillate or alternatively using said distillate for direct heating in a catalytic depolymerization step.

12. The method of claim 1, further comprising the step of particle size reducing said biomass to produce a ground material using ultrasound particle size reduction.

13. The method of claim 1, further comprising the step of storing said reaction mixture in a vessel.

14. The method of claim 1, further comprising the step of fractionation to separate said distillate oil into a naphtha distillate fraction, a kerosene distillate fraction, a diesel distillate fraction and a recovered carrier fluid.

15. The method of claim 1, further comprising the step of employing said vaporizer to convert a waste material to an ash, thereby reducing the volume of said waste material for disposal and an amount of said carrier fluid lost from said method.

16. The method of claim 1, wherein a reactor and a distillation tower are configured as a single vessel to produce a catalytically active biomass slurry and to facilitate catalytic cracking.

17. The method of claim 1, further comprising the step of cooling and condensing a distillate vapor to permit its recovery as a liquid.

18. The method of claim 1, further comprising the step of metering and slurrying said first catalyst with said second carrier fluid.

19. The method of claim 1, further comprising the step of heating said reaction mixture and an additional catalyst slurry.

20. A method of thermal processing and catalytic cracking of biomass within a combined carrier fluid, the method comprising the steps of:

(a) grinding said biomass to a powder followed by slurrying said biomass within a first carrier fluid to create a reaction mixture;

(b) dehydrating said reaction mixture to remove and recover an amount of water;

(c) slurrying a first catalyst within a second carrier fluid to create a catalyst slurry;

(d) heating said reaction mixture a first temperature;

(e) heating said catalyst slurry to a second temperature, wherein said first temperature is more than said second temperature such that a portion of said biomass liquefies and vaporizes within said first carrier fluid, breaking down said biomass into its compositional elements, whereby a resulting biomass vapor condenses into said first carrier fluid to become available for catalytic cracking;

(f) adding said reaction mixture and said catalyst slurry together within a reactor to form a catalytic active biomass slurry that is at a temperature above an activation temperature of said first catalyst to initiate catalytic cracking;

(g) reheating said catalytic active biomass slurry through the adding of a recycled carrier fluid and recirculation of said catalytic active biomass slurry through a heating exchanger for discharge back into said reactor to maintain an operating temperature above said activation temperature to continue and maintain catalytic cracking;

(h) thermal processing a residual non-catalytic cracked reaction mixture under an inert, non-oxidizing environment, whereby a second catalyst is added to said residual non-catalytic cracked reaction mixture;

(i) distilling a carrier fluid portion within said residual non-catalytic cracked reaction to recover and recycle as a liquid for heating; and (j) reheating and fractionation of a resulting distillate oil to remove and separate nitrogen and oxygen containing compounds as an oil fraction within said carrier fluid portion, allowing for the recovery of naphtha, kerosene and diesel.

* * * * *